US012798668B2

(12) United States Patent
Suzuki et al.

(10) Patent No.: US 12,798,668 B2
(45) Date of Patent: Nov. 17, 2026

(54) STEERING DEVICE

(71) Applicant: DENSO CORPORATION, Kariya-city (JP)

(72) Inventors: Yuta Suzuki, Kariya-city (JP); Shuji Kuramitsu, Kariya-city (JP); Takafumi Sato, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 107 days.

(21) Appl. No.: 18/825,916

(22) Filed: Sep. 5, 2024

(65) Prior Publication Data

US 2024/0425107 A1 Dec. 26, 2024

Related U.S. Application Data

(63) Continuation of application No. PCT/JP2023/007807, filed on Mar. 2, 2023.

(30) Foreign Application Priority Data

Mar. 8, 2022 (JP) ................................ 2022-035058
Jul. 4, 2022 (JP) ................................ 2022-107882

(51) Int. Cl.
*B62D 6/00* (2006.01)
*B62D 5/04* (2006.01)
(Continued)

(52) U.S. Cl.
CPC ........... *B62D 6/002* (2013.01); *B62D 5/0418* (2013.01); *B62D 6/001* (2013.01); *B62D 7/1509* (2013.01); *B62D 7/159* (2013.01); *B62D 15/021* (2013.01)

(58) Field of Classification Search
CPC ...... B62D 6/002; B62D 5/0418; B62D 6/001; B62D 7/1509; B62D 7/159; B62D 15/021
(Continued)

(56) References Cited

U.S. PATENT DOCUMENTS

2012/0046835 A1 2/2012 Matsumoto et al.
2014/0305715 A1 10/2014 Makino et al.
2021/0316786 A1 10/2021 Nakata

FOREIGN PATENT DOCUMENTS

CN 109664937 A * 4/2019 .............. B62D 6/00
EP 1136344 A2 9/2001
(Continued)

OTHER PUBLICATIONS

CN-109664937-A—English Translation (Year: 2019).*
JP-2001334951-A English Translation (Year: 2001).*
JP-2007282330-A—English Translation (Year: 2007).*

*Primary Examiner* — Scott A Reinbold
(74) *Attorney, Agent, or Firm* — Precision Patents, P.C.

(57) ABSTRACT

A steering device controls a turning angle of each wheel in a vehicle. The vehicle has wheels, which are not mechanically constrained to each other. The wheels are steered independently. The steering device includes an operation determination unit, a coordinate determination unit, a turning angle calculator, and steering actuators. The operation determination unit determines a vehicle operation mode based on the vehicle state. The coordinate determination unit determines the coordinates of the turning center of the vehicle based on the vehicle operation mode. The turning angle calculator calculates a turning angle command value for each wheel based on the coordinates of the turning center. The steering actuators are provided correspondingly to the respective wheels. These steering actuators steer the respective wheels according to the turning angle command values.

15 Claims, 36 Drawing Sheets

[3B] LATERAL MOVEMENT MODE FROM BACKWARD MOVEMENT
(WHEN MOVING OBLIQUELY)

(51) Int. Cl.
*B62D 7/15* (2006.01)
*B62D 15/02* (2006.01)

(58) Field of Classification Search
USPC .............................................................. 701/41
See application file for complete search history.

(56) References Cited

FOREIGN PATENT DOCUMENTS

| | | | |
|---|---|---|---|
| JP | 2001334951 A | * 12/2001 | ............... B62D 6/00 |
| JP | 2007282330 A | * 10/2007 | |

* cited by examiner

PARALLEL STEERING GEOMETRY

ACKERMANN STEERING GEOMETRY

PARALLEL STEERING GEOMETRY

ACKERMANN STEERING GEOMETRY

[1] FORWARD TURNING MODE (SMALL U-TURN)

[1] FORWARD TURNING MODE (NARROW ROAD CRANK TRAVELING)

[1] FORWARD TURNING MODE

[2] NON-FORWARD TURNING MODE (SPIN TURN)

[2] NON-FORWARD TURNING MODE (SPIN TURN)

[2] NON-FORWARD TURNING MODE (PIVOT TURN)

[2] NON-FORWARD TURNING MODE (PIVOT TURN)

[3A] LATERAL MOVEMENT MODE FROM FORWARD MOVEMENT

[3A] LATERAL MOVEMENT MODE FROM FORWARD MOVEMENT
(WHEN MOVING OBLIQUELY)

[3B] LATERAL MOVEMENT MODE FROM BACKWARD MOVEMENT
(WHEN MOVING OBLIQUELY)

[3B] LATERAL MOVEMENT MODE FROM BACKWARD MOVEMENT
(WHEN MOVING DIRECTLY LATERAL)

TURNING CENTER REGION (EXTENDED REGION)

COORDINATE WITH CENTER OF GRAVITY AS ORIGIN $$\tan\delta_{FL} = \frac{Y - Lf}{X + \frac{Df}{2}} \quad \cdots (0.1) \qquad \tan\delta_{FR} = \frac{Y - Lf}{X - \frac{Df}{2}} \quad \cdots (0.2)$$

$$\tan\delta_{RL} = \frac{Y + Lr}{X + \frac{Dr}{2}} \quad \cdots (0.3) \qquad \tan\delta_{RR} = \frac{Y + Lr}{X - \frac{Dr}{2}} \quad \cdots (0.4)$$

DETERMINATION OF TURNING CENTER COORDINATES WHEN TURNING LEFT $$X_L = \frac{-\frac{1}{2}(Df\tan\delta_{FI} - Dr\tan\delta_{RI}) - (Lf + Lr)}{\tan\delta_{FI} - \tan\delta_{RI}} \quad \cdots (1)$$

$$Y_L = \left\{ \frac{-\frac{1}{2}(Df\tan\delta_{FI} - Dr\tan\delta_{RI}) - (Lf + Lr)}{\tan\delta_{FI} - \tan\delta_{RI}} + \frac{Df}{2} \right\} \tan\delta_{FI} + Lf \quad \cdots (2)$$

DETERMINATION OF TURNING CENTER COORDINATES WHEN TURNING RIGHT $$X_R = \frac{\frac{1}{2}(Df\tan\delta_{FI} - Dr\tan\delta_{RI}) - (Lf + Lr)}{\tan\delta_{FI} - \tan\delta_{RI}} \quad \cdots (3)$$

$$Y_R = \left\{ \frac{\frac{1}{2}(Df\tan\delta_{FI} - Dr\tan\delta_{RI}) - (Lf + Lr)}{\tan\delta_{FI} - \tan\delta_{RI}} - \frac{Df}{2} \right\} \tan\delta_{FI} + Lf \quad \cdots (4)$$

FIRST EXAMPLE IN FORWARD TURNING MODE

SECOND EXAMPLE IN FORWARD TURNING MODE

THIRD EXAMPLE IN FORWARD TURNING MODE

FOURTH EXAMPLE IN FORWARD TURNING MODE

FIRST EXAMPLE IN NON-FORWARD TURNING MODE

REFERENCE EXAMPLE IN NON-FORWARD TURNING MODE

THIRD EXAMPLE IN NON-FORWARD TURNING MODE

FIRST EXAMPLE IN LATERAL MOVEMENT MODE

SECOND EXAMPLE IN LATERAL MOVEMENT MODE

THIRD EXAMPLE IN LATERAL MOVEMENT MODE

STEERING DEVICE

CROSS REFERENCE TO RELATED APPLICATIONS

The present application is a continuation application of International Patent Application No. PCT/JP2023/007807 filed on Mar. 2, 2023, which designated the U.S. and claims the benefit of priority from Japanese Patent Application No. 2022-035058 filed on Mar. 8, 2022, and Japanese Patent Application No. 2022-107882 filed on Jul. 4, 2022. The entire disclosures of all of the above applications are incorporated herein by reference.

TECHNICAL FIELD

The present disclosure relates to a steering device.

BACKGROUND

Conventional steering devices control a steering state so as to perform a turning operation suited to a vehicle state.

SUMMARY

According to at least one embodiment, a steering device controls a turning angle of each wheel in a vehicle. The vehicle has three or more wheels, which are not mechanically constrained to each other. The vehicle includes one or more front wheels and one or more rear wheels. The wheels are steered independently. The steering device includes an operation determination unit, a coordinate determination unit, a turning angle calculator, and steering actuators. The operation determination unit determines a vehicle operation mode based on the vehicle state. The vehicle operation mode includes a forward turning mode, a non-forward turning mode, and a lateral movement mode. In the forward turning mode, the vehicle turns while moving forward. In the non-forward turning mode, the vehicle turns without moving forward. In the lateral movement mode, the vehicle moves in a lateral direction that intersects with the longitudinal axis of the vehicle. The coordinate determination unit determines the coordinates of the turning center of the vehicle based on the vehicle operation mode determined by the operation determination unit. The turning angle calculator calculates a turning angle command value for each wheel based on the coordinates of the turning center determined by the coordinate determination unit. The steering actuators are provided correspondingly to the respective wheels. These steering actuators steer the respective wheels according to the turning angle command values calculated by the turning angle calculator.

BRIEF DESCRIPTION OF DRAWINGS

The details of one or more embodiments are set forth in the accompanying drawings and the description below. Other features and advantages will be apparent from the description and drawings, and from the claims.

In the Drawings.

DETAILED DESCRIPTION

Figure 1:
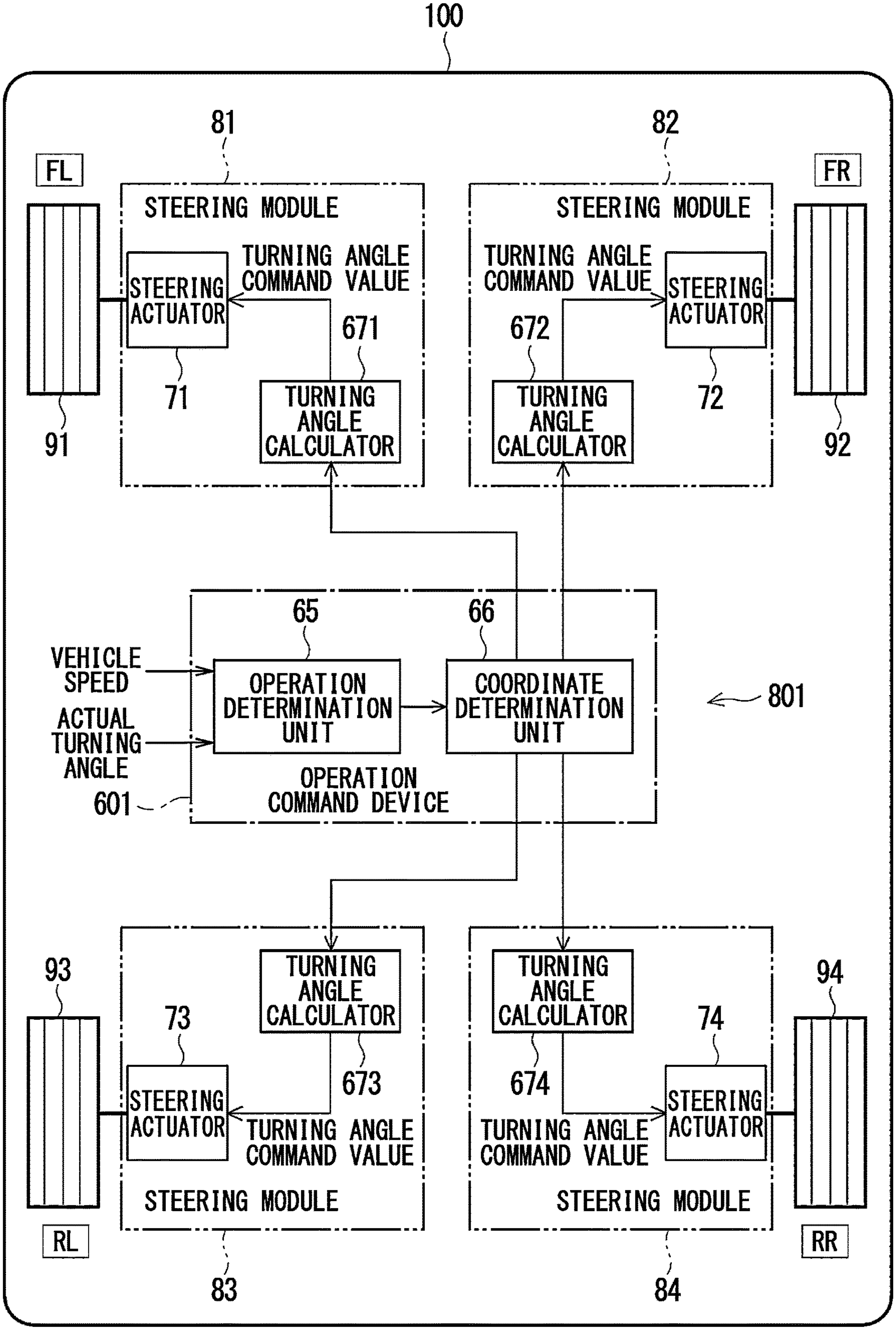
FIG. 1 is a block diagram of a steering device according to a first embodiment.

To begin with, examples of relevant techniques will be described.

Conventionally, there are known steering devices that attempt to realize a turning operation suited to a vehicle state. For example, a vehicle steering system according to a comparative example changes a steering ratio between an inner wheel and an outer wheel based on vehicle speeds so that left and front right wheels are steered according to Ackermann steering geometry at low speeds and according to parallel steering geometry at high speeds.

In the vehicle steering system of the comparative example, the left and rear right wheels are not steered, and a settable area of a vehicle's turning center is limited to a rear wheel axis passing through a center of the left and rear right wheels. In contrast to this conventional technology, in a four-wheel independently steering vehicle in which a left and rear right wheels as well as a left and front right wheels can be steered independently, a range in which a turning center can be set is expanded to a wider range. By setting the turning center in the extended region and steering each wheel, it is possible to perform turns that are particularly suitable for driving in urban areas, which were not possible with conventional non-independently steering vehicles. Conventionally, no steering theory unique to such independently steering vehicles has been known.

In contrast to the comparative example, according to a steering device of the present disclosure, a desired vehicle operation mode can be realized in an independently steering vehicle having three or more wheels.

According to one aspect of the present disclosure, a steering device controls a turning angle of each wheel in a vehicle. The vehicle has three or more wheels, which are not mechanically constrained to each other. The vehicle includes one or more front wheels and one or more rear wheels. The wheels are steered independently. The steering device includes an operation determination unit, a coordinate determination unit, a turning angle calculator, and steering actuators. The operation determination unit determines a vehicle operation mode based on the vehicle state. The vehicle operation mode includes a forward turning mode, a non-forward turning mode, and a lateral movement mode. In the forward turning mode, the vehicle turns while moving forward. In the non-forward turning mode, the vehicle turns without moving forward. In the lateral movement mode, the vehicle moves in a lateral direction that intersects with the longitudinal axis of the vehicle. The coordinate determination unit determines the coordinates of the turning center of the vehicle based on the vehicle operation mode determined by the operation determination unit. The turning angle calculator calculates a turning angle command value for each wheel based on the coordinates of the turning center determined by the coordinate determination unit. The steering actuators are provided correspondingly to the respective wheels. These steering actuators steer the respective wheels according to the turning angle command values calculated by the turning angle calculator.

In the present disclosure, by setting the coordinates of the turning center in vehicle operation modes such as the forward turning mode, the non-forward turning mode, and the lateral movement mode to an extended region wider than a conventional settable area, it is possible to realize vehicle operation with a high degree of freedom that is particularly suitable for driving in urban areas.

The turning angle calculator calculates the turning angle of each wheel so that the turning direction of each wheel is perpendicular to a straight line connecting the turning center and the center of each wheel.

Hereinafter, multiple embodiments of a steering device will be described with reference to the drawings. In the multiple embodiments, substantially the same components are denoted by the same reference numerals, and a description of the same components will be omitted. In the following description, first and second embodiments are collectively referred to as a present embodiment. The steering device of the present embodiment controls a turning angle of each wheel in a vehicle in which four wheels that are not mechanically restricted from one another can be turned independently.

First Embodiment

A steering device 801 of a first embodiment will be described with reference to FIGS. 1, 2. In an independently steering vehicle 100 shown in FIG. 1, four wheels 91 to 94 are not mechanically constrained to one another and can be turned independently. A front left wheel 91 is defined as "FL", a front right wheel 92 is defined as "FR", a rear left wheel 93 is defined as "RL", and a rear right wheel 94 is defined as "RR".

Steering modules 81-84 each including a turning angle calculator 671-674 and a steering actuator 71-74 integrated therewith are provided correspondingly to each of the wheels 91-94. Steering actuators 71-74 are typically constituted by motors. The numbers "1" to "4" at an end of reference numerals of each element represent the corresponding wheels 91 to 94. For example, a steering module 81 in which the turning angle calculator 671 and the steering actuator 71 are integrated corresponds to the front left wheel 91.

The steering device 801 includes an operation command device 601 and four steering modules 81-84 corresponding to the wheels 91-94, respectively. The operation command device 601 includes a operation determination unit 65 and a coordinate determination unit 66. The operation determination unit 65 determines a vehicle operation mode, which will be described later, based on information on a vehicle state including a vehicle speed and actual turning angles of each of the wheels 91-94. Although not shown in the figure, the vehicle speed is detected by, for example, a vehicle speed sensor. The actual turning angle of each of the wheels 91-94 is estimated, for example, by converting a rotation angle detection value of a steering actuator. The turning angle is defined, for example, so that a left side is positive and a right side is negative with respect to a neutral position.

The coordinate determination unit 66 determines coordinates of a turning center of the vehicle based on the vehicle operation mode determined by the operation determination unit 65. Turning angle calculators 671-674 calculate turning angle command values for the corresponding wheels 91-94 based on the coordinates of the turning center determined by the coordinate determination unit 66. The steering actuators 71-74 steer the wheels 91-94 in accordance with the turning angle command values calculated by the turning angle calculators 671-674.

Figure 2:
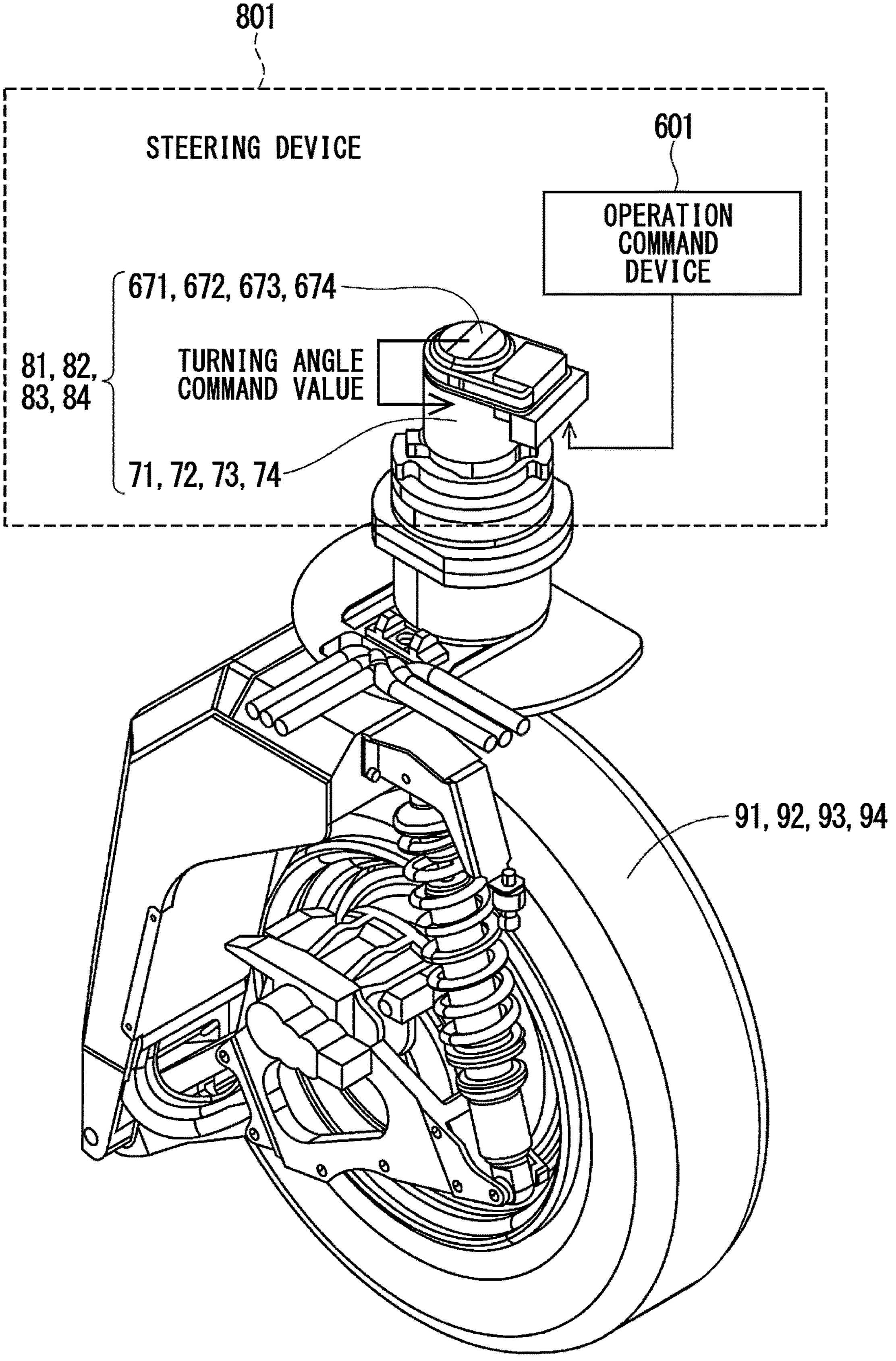
FIG. 2 is a diagram illustrating a specific example of a steering module.

FIG. 2 shows a specific example of the steering modules 81-84. In the first embodiment, an integrated mechanical and electrical configuration is adopted in which the turning angle calculators 671-674 corresponding to the respective wheels 91-94 and the steering actuators 71-74 are integrally provided. The steering actuators 71-74 operate in accordance with the turning angle command values calculated by the turning angle calculators 671-674 for each wheel. By distributing the turning angle calculators 671-674, a risk of a turning angle calculation function for all the wheels 91-94 failing at once is avoided.

In contrast to the independently steering vehicle 100 in which the wheels 91-94 are not mechanically restrained from each other, a conventional vehicle is a "non-independently steering vehicle" in which left and front right wheels and left and rear right wheels are each connected by a rack bar. Before describing a steering theory according to the present embodiment, a cornering operation according to the parallel steering geometry and Ackermann steering geometry will be described as a steering theory for a conventional vehicle equipped with a rack bar with reference to FIGS. 3 to 5B. The following description will be given mainly with a left turning operation as an example.

Figure 3:
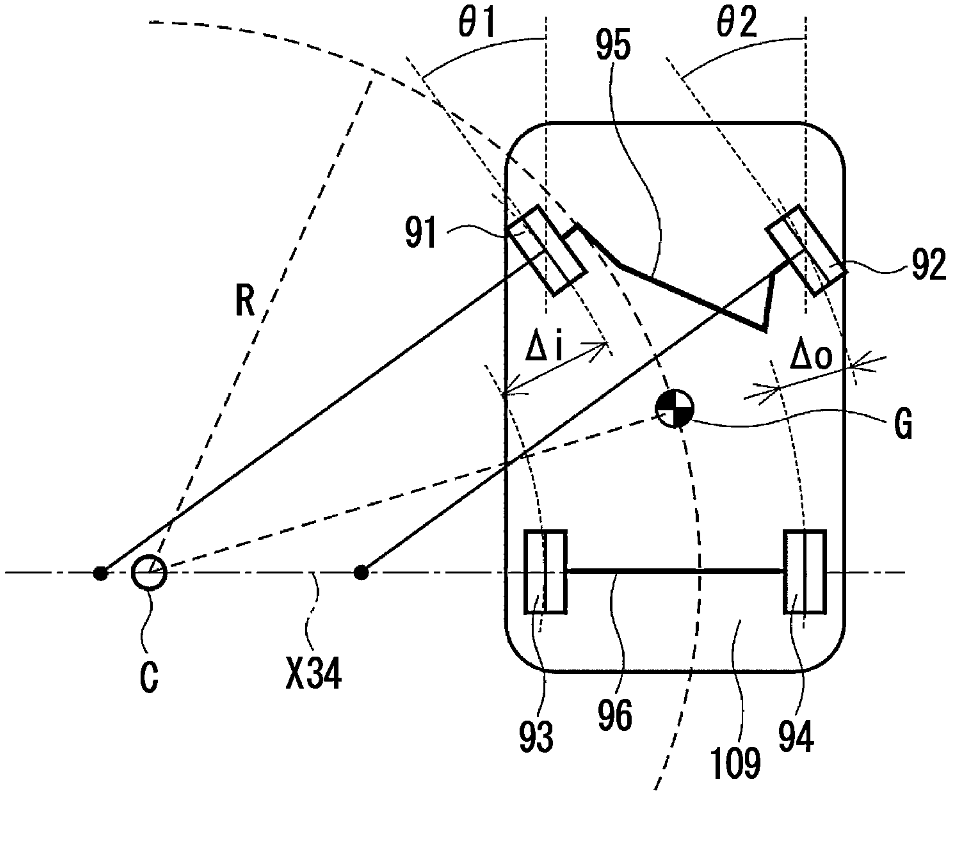
FIG. 3 is a diagram illustrating a turning operation according to parallel steering geometry.
Figure 4:
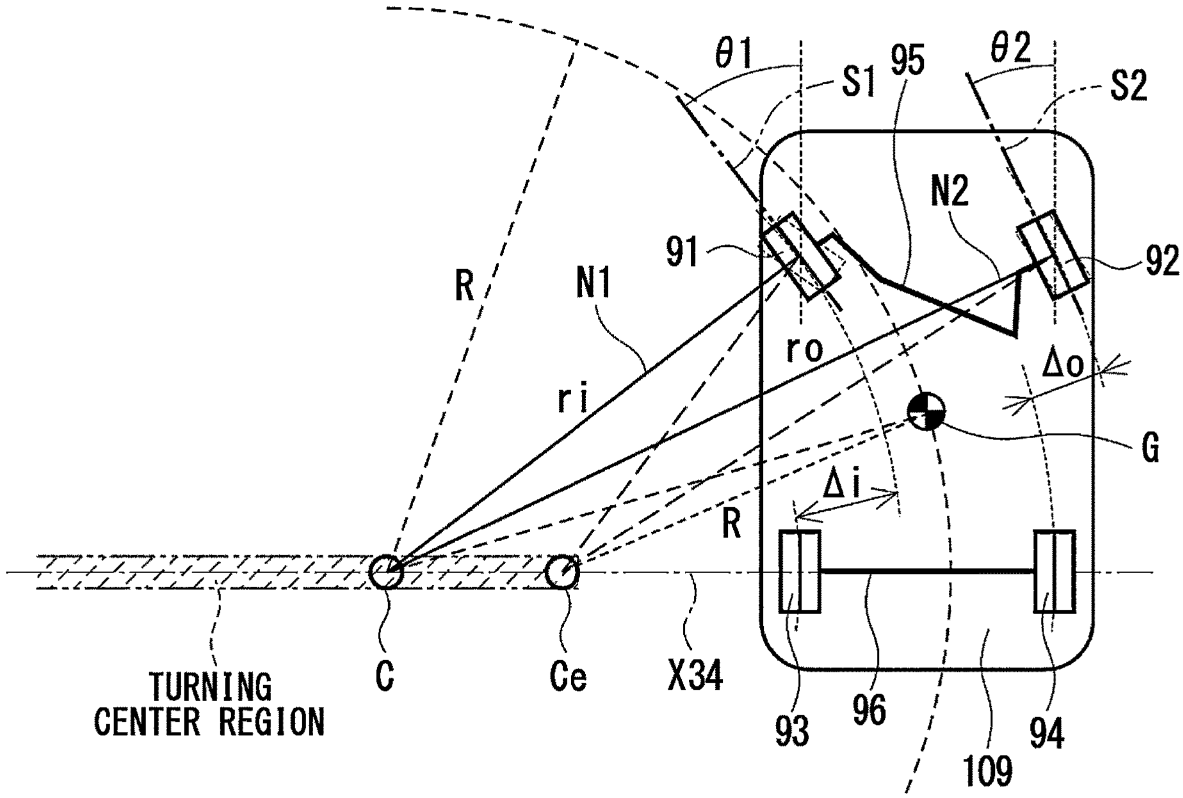
FIG. 4 is a diagram illustrating a turning operation according to Ackermann steering geometry.
Figure 5A:
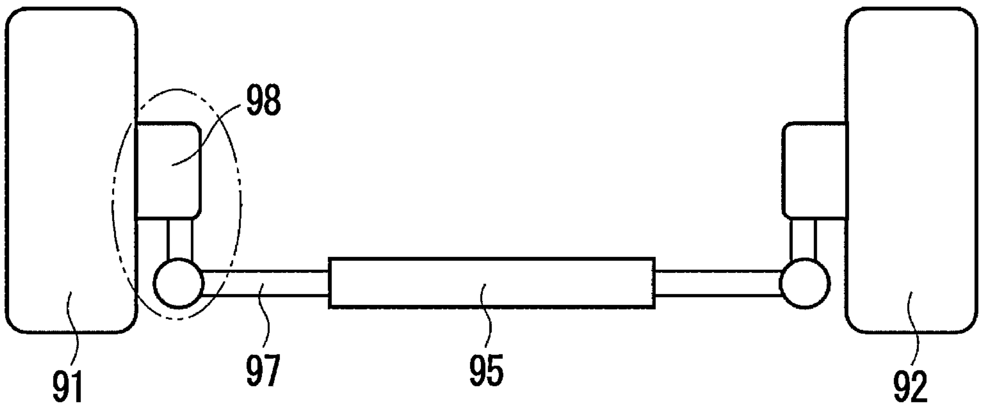
FIG. 5A is a schematic diagram illustrating a link mechanism corresponding to the parallel steering geometry.
Figure 5B:
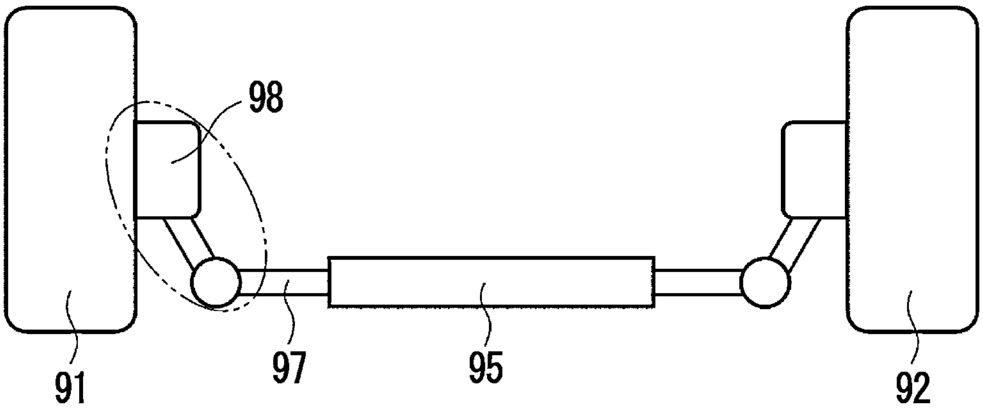
FIG. 5B is a schematic diagram illustrating a link mechanism corresponding to Ackermann steering geometry.

As shown in FIGS. 3 and 4, in a non-independently steering vehicle 109, left and front right wheels 91, 92 are connected by a rack bar 95, and left and rear right wheels 93, 94 are connected by a rack bar 96. A mechanism for connecting the left and front right wheels 91, 92 is shown in FIGS. 5A and 5B. The left and front right wheels 91, 92 can be steered within a predetermined possible range by a link mechanism of a tie rod 97 and a knuckle 98. On the other hand, since the left and rear right wheels 93, 94 are not steered, a turning center C is set on a rear wheel axis X34.

As shown in FIG. 5A, in the parallel steering geometry link mechanism, a positional relationship between the tie rod 97 and the knuckle 98 is fixed. As shown in FIG. 3, in a turning operation according to the parallel steering geometry, the front left wheel 91 and the front right wheel 92 are steered in parallel. In other words, a turning angle θ1 of the front left wheel 91 and a turning angle θ2 of the front right wheel 92 are equal. A center of gravity G of the vehicle moves in an arc with a turning radius R relative to the turning center C. The front left wheel 91 and the front right wheel 92 turn with their tires skidding. In addition, an inner wheel difference Δi between the front left wheel 91 and a rear left wheel 93, and an outer wheel difference Δo between the front right wheel 91 and a rear right wheel 93 are generated.

As shown in FIG. 5B, in an Ackermann steering geometry link mechanism, a positional relationship between the tie rod 97 and the knuckle 98 is set to be flexible. As shown in FIG. 4, in a turning operation according to Ackermann steering geometry, a steering direction of the front left wheel 91 is perpendicular to a line N1 connecting the turning center C and the center of the front left wheel 91, and the steering direction of the front right wheel 92 is perpendicular to a line N2 connecting the turning center C and the center of the front right wheel 92.

When viewed from directly above, a straight line passing through a center in a width direction of the left and front right wheels 91, 92 and extending in the steering direction is represented as "wheel width center lines S1, S2." In a turning operation according to Ackermann steering geometry, the wheel width center lines S1, S2 of the left and front right wheels 91, 92 become tangents to a turning circle centered on the turning center C. In other words, the straight lines N1, N2 connecting the turning center C and the centers of the front wheels 91, 92 are normal to the wheel width centerlines S1, S2.

The front wheel 91 on an inside of the turn describes an arc with a turning radius ri, and the front wheel 92 on an outside of the turn describes an arc with a turning radius ro, thereby turning without skidding. A turning angle θ1 of the front wheel 91 on the inside of the turn is greater than a turning angle θ2 of the front wheel 92 on the outside of the turn. In addition, the further away the turning center C is from the vehicle, the smaller the turning angles θ1, θ2 become, and the closer the turning center C is to the vehicle, the larger the turning angles θ1, θ2 become. The turning angles θ1 and θ2 are maximum when the turning center Ce is set at a limit position closest to the vehicle. In this way, an area on the rear wheel axis X34 outside the limit position becomes a turning center region.

The parallel steering geometry allows a tire's power to be used effectively at high speeds, enabling stable cornering. However, at low to medium speeds, the tires tend to skid sideways, making smooth cornering difficult. On the other hand, with Ackermann steering geometry, the tire force cannot be used effectively at high speeds, making stable cornering difficult. However, at low to medium speeds, the tires slip less sideways, allowing for smooth cornering. Therefore, Ackermann steering geometry is effective for driving in urban areas at low to medium speeds.

However, assuming that the rear wheels 93, 94 are not turned, the turning center region is limited to an area outside the limit position on the rear wheel axis X34. Furthermore, the inner wheel difference Δi and the outer wheel difference Δo occur. Therefore, there are cases where benefits of Ackermann steering geometry cannot be fully utilized for the desired vehicle operation. Therefore, in the present embodiment, an object is to establish a steering theory that is an extension of Ackermann theory in order to preferably realize a desired vehicle operation mode by independently steering vehicles 100.

The operation determination unit 65 of the present embodiment determines the following three vehicle operation modes based on the vehicle state: [1] a "forward turning mode" in which the vehicle turns while moving forward, [2] a "non-forward turning mode" in which the vehicle turns without moving forward, and [3] a "lateral movement mode" in which the vehicle moves laterally with respect to a front-rear axis.

Figure 7:
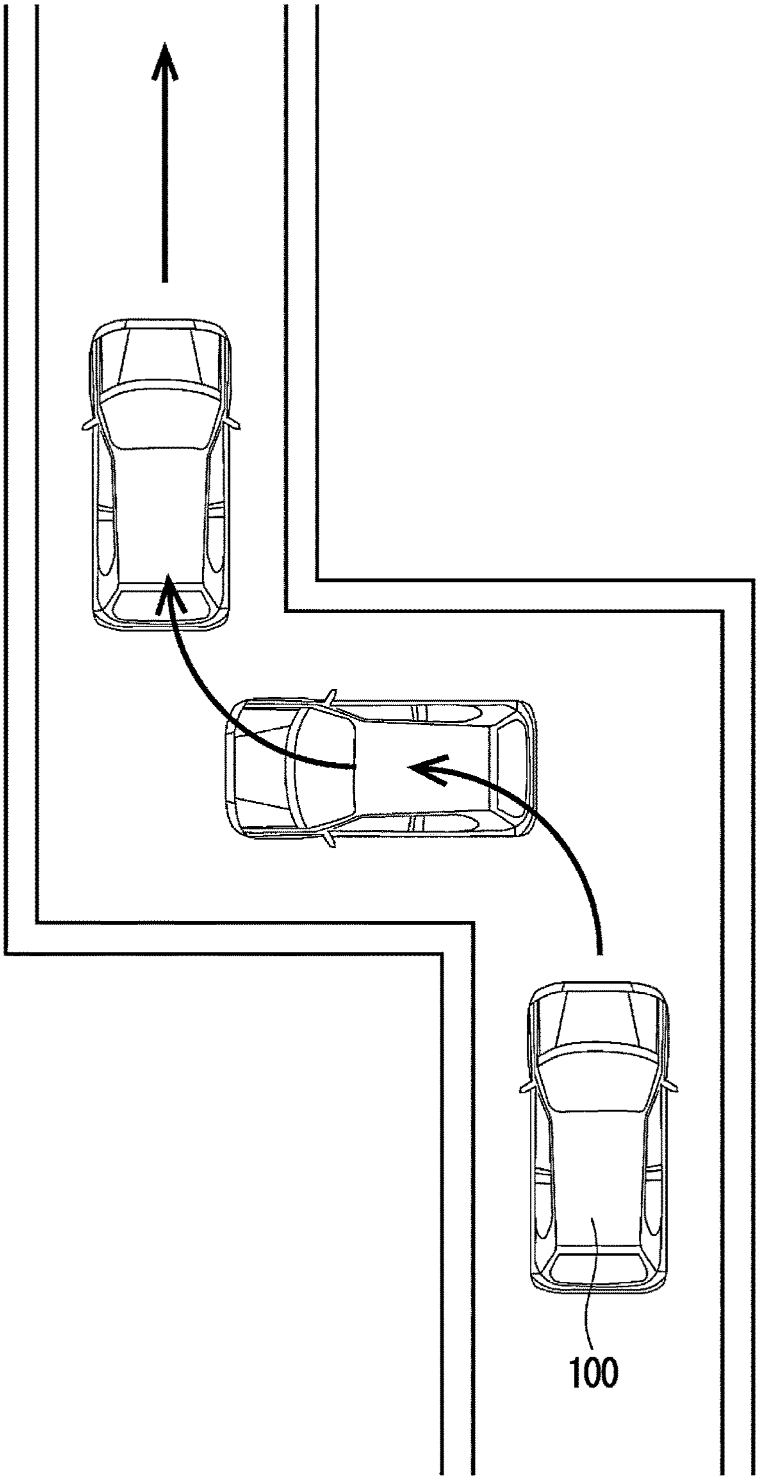
FIG. 7 is a diagram illustrating a vehicle operation in the forward turning mode (narrow road crank traveling)
Figure 8:
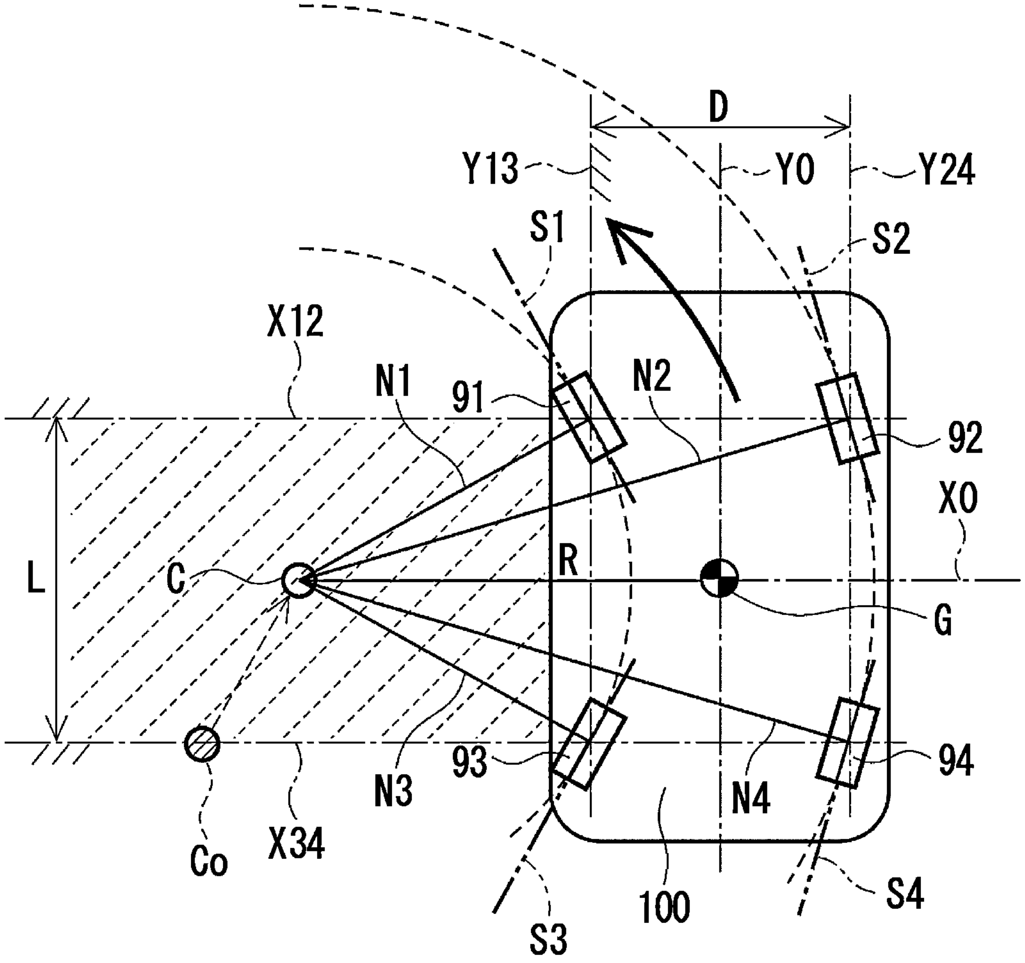
FIG. 8 is a diagram illustrating a turning center region in the forward turning mode.

Next, each vehicle operation mode and its turning center region will be described with reference to FIGS. 6 to 19. In FIG. 8, an axis passing through the centers of the front wheels 91, 92 and perpendicular to a vehicle longitudinal axis Y0 is defined as a front wheel axis X12, and an axis passing through the centers of the rear wheels 93, 94 and perpendicular to the vehicle longitudinal axis Y0 is defined as a rear wheel axis X34. The distance between the front wheel axis X12 and the rear wheel axis X34 is a wheelbase L. Further, an axis passing through the center of gravity G and perpendicular to the vehicle longitudinal axis Y0 is represented as a gravity axis X0. Assuming that weight distribution in a vehicle front-rear direction is uniform, the gravity axis X0 is located midway between the front wheel axis X12 and the rear wheel axis X34.

Additionally, an axis passing through a centers of the front and rear wheels on the same left-right side of the vehicle is defined as a front-rear wheel axis. An axis passing through centers of the front left wheel 91 and the rear left wheel 93 is represented as a left-front-rear wheel axis Y13, and an axis passing through centers of the front right wheel 92 and the rear right wheel 94 is represented as a right-front-rear wheel axis Y24. A distance between the left-front-rear wheel axis Y13 and the right-front-rear wheel axis Y24 is a tread width D. The left-front-rear wheel axis Y13 and the right-front-rear wheel axis Y24 are symmetrical with respect to the vehicle longitudinal axis Y0, and a distance between the left-front-rear wheel axis Y13 and the vehicle longitudinal axis Y0, and a distance between the right-front-rear wheel axis Y24 and the vehicle longitudinal axis Y0 are both expressed as (D/2). The center of gravity G of the vehicle is located on the vehicle longitudinal axis Y0.

An area between the front wheel axis X12 and the rear wheel axis X34 in the vehicle front-rear direction and between the left-front-rear wheel axis Y13 and the right-front-rear wheel axis Y24 in the vehicle left-right direction is referred to as an "interior of the vehicle." Areas other than the interior of the vehicle are referred to as an "exterior of the vehicle." According to this definition, a front of an engine compartment and a rear of a trunk are technically inside the vehicle body but are the exterior of the vehicle. However, in reality, a boundary area may be considered flexibly and the "exterior of the vehicle" and an "exterior of a vehicle body" may be interpreted as being synonymous.

[1] Forward Turning Mode

Figure 6:
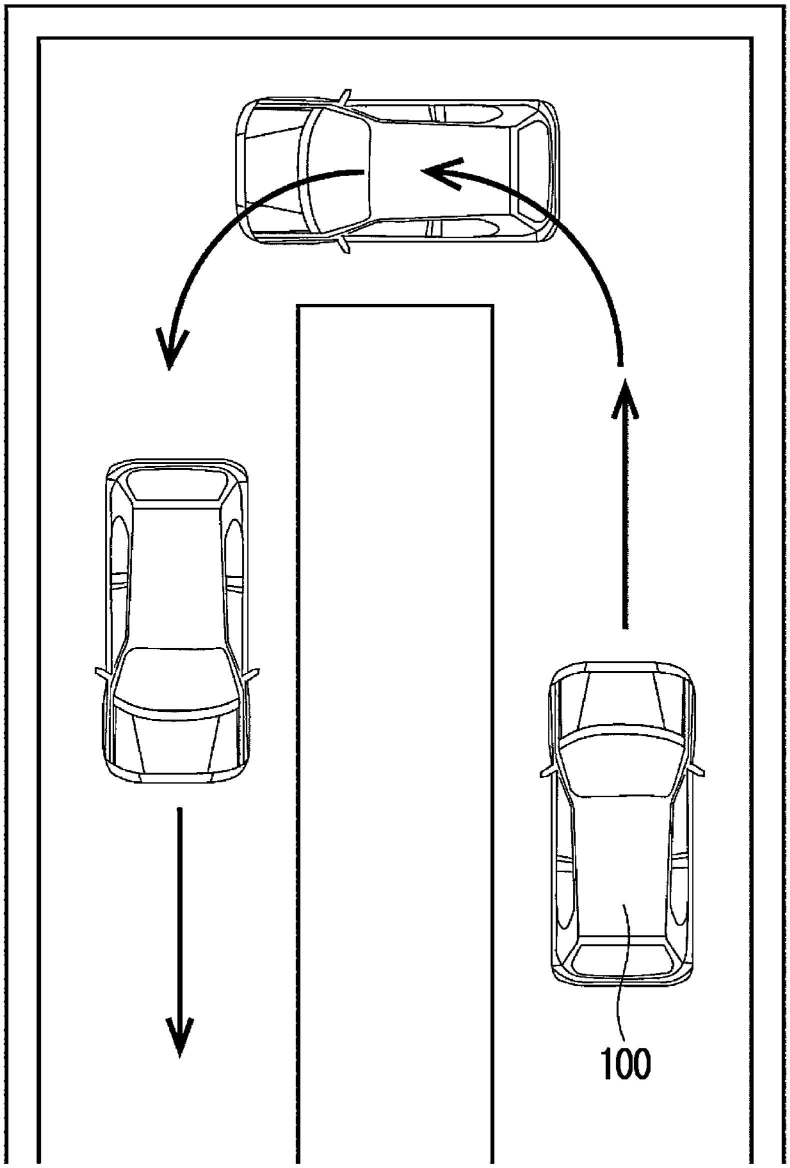
FIG. 6 is a diagram illustrating a vehicle operation (small U-turn) in a forward turning mode.

Next, the forward turning mode will be described with reference to FIGS. 6 to 8. As an example of vehicle operation in the forward turning mode, FIG. 6 shows a tight U-turn, and FIG. 7 shows crank driving on a narrow road. In the case of a tight U-turn, the vehicle 100 turns continuously in the same direction (for example, left) while moving forward. In the case of the narrow road crank traveling, the vehicle 100 transitions, for example, from turning left to turning right while moving forward.

FIG. 8 shows the turning center region in the forward turning mode. The coordinate determination unit 66 determines the coordinates of one turning center C on the inside of the turning and outside the vehicle between the front wheel axis X12 and the rear wheel axis 34 when the operation determination unit 65 commands the forward turning mode. Once the turning center C is determined, a turning radius R of the center of gravity G of the vehicle is determined. The turning radius R in the forward turning mode is equal to or greater than half the tread width D. That is, a relationship "$R \geq (D/2)$" holds true.

Furthermore, the turning angle calculators 671-674 calculate the turning angle of each of the wheels 91-94 based on Ackermann theory so that a turning direction of each of the wheels 91-94 is perpendicular to straight lines N1-N4 connecting the turning center C and the centers of each of the wheels 91-94. A specific formula for calculating the turning angle will be described later with reference to FIG. 22.

The turning center of the turning operation according to Ackermann steering geometry in the non-independently steering vehicle 109 shown in FIG. 4 is defined as a "conventional turning center Co." As described above, the conventional turning center Co is set on the rear wheel axis X34. An operation of moving the turning center C from the conventional turning center Co to the turning center region hatched with dashed lines represents an "extension of Ackermann theory." Therefore, the turning center region of the present embodiment is also called an "extended region."

As shown in FIG. 8, the extended region for turning left is defined on the left side of the vehicle. On the other hand, in a case of turning right, the extended region is defined on the right side of the vehicle. In a first half of the narrow road crank traveling, the turning center C is set in the extended region on the left side of the vehicle, which corresponds to the inside of the turn. In a latter half of the narrow road crank traveling, the turning center C is set in the extended region on the right side of the vehicle, which corresponds to the inside of the turn.

In the example shown in FIG. 8, the turning center C is set on the gravity axis X0 in the extended region. In this case, the front left wheel 91 and the rear left wheel 93, and the front right wheel 92 and the rear right wheel 94 each turn on the same arc, so that the inner wheel difference $\Delta i$ and the outer wheel difference $\Delta o$ become zero. On the other hand, when the turning center C is set other than on the gravity axis X0, the inner wheel difference $\Delta i$ and the outer wheel difference $\Delta o$ can be set to any value.

[2] Non-Forward Turning Mode

Figure 9:
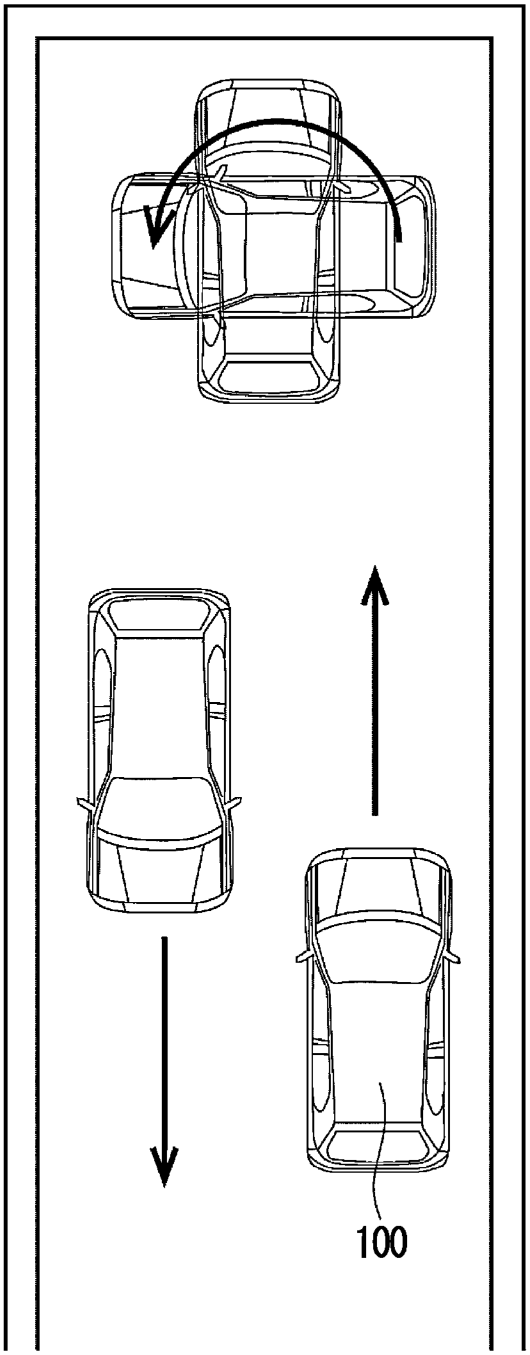
FIG. 9 is a diagram illustrating a vehicle operation (spin turn) in a non-forward turning mode.

Next, the non-forward turning mode will be described with reference to FIGS. 9 to 12. As an example of the vehicle operation in the non-forward turning mode, FIG. 9 shows a spin turn, and FIG. 11 shows a pivot turn. In the case of the spin turn, the vehicle 100 turns on a spot from a stopped state. For example, when there is a dead end ahead, it is possible to perform a 180 degrees pivot turn by making the spin turn and return without having to back up. In the case of the pivot turn, the vehicle 100 turns from a stopped state by using one wheel as a fulcrum to drive the other wheels. For example, when there is an obstacle directly ahead, it is possible to perform the pivot turn to turn diagonally and move forward.

Figure 10:
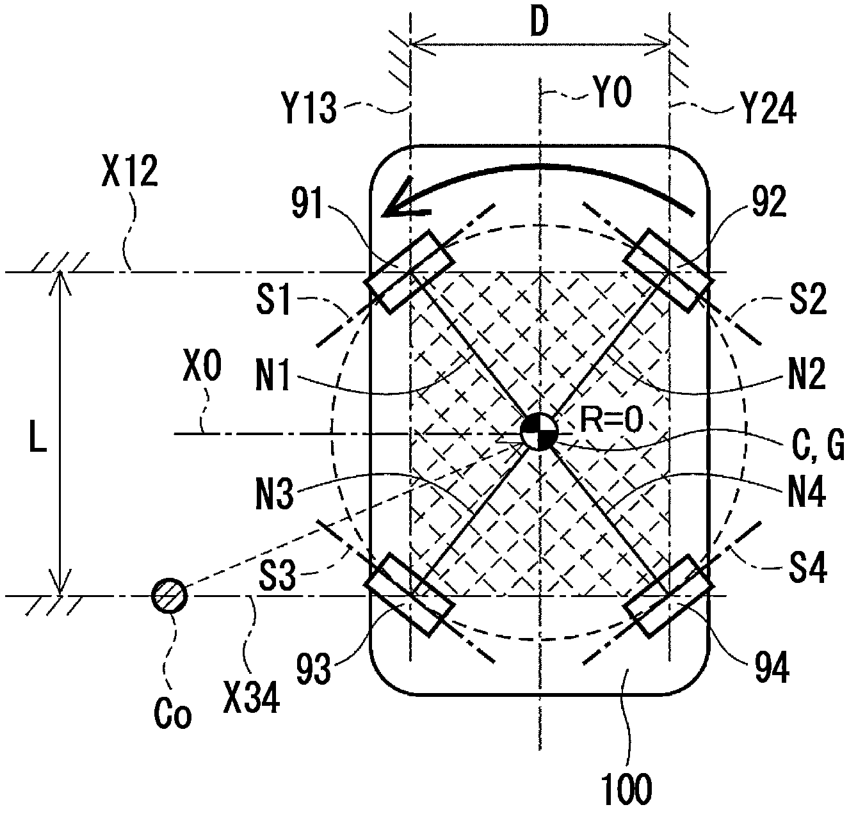
FIG. 10 is a diagram illustrating the turning center region in the non-forward turning mode (spin turn)
Figure 11:
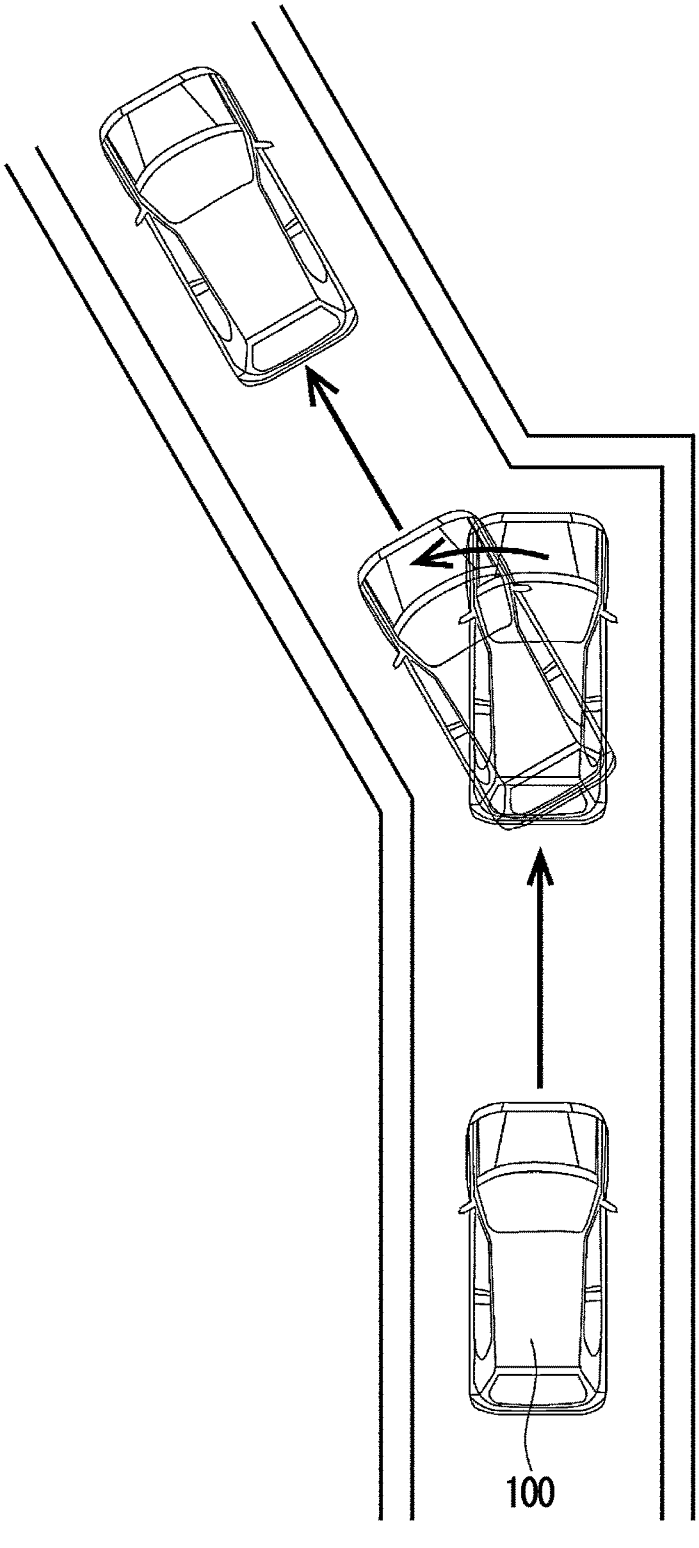
FIG. 11 is a diagram illustrating a vehicle operation (pivot turn) in the non-forward turning mode.
Figure 12:
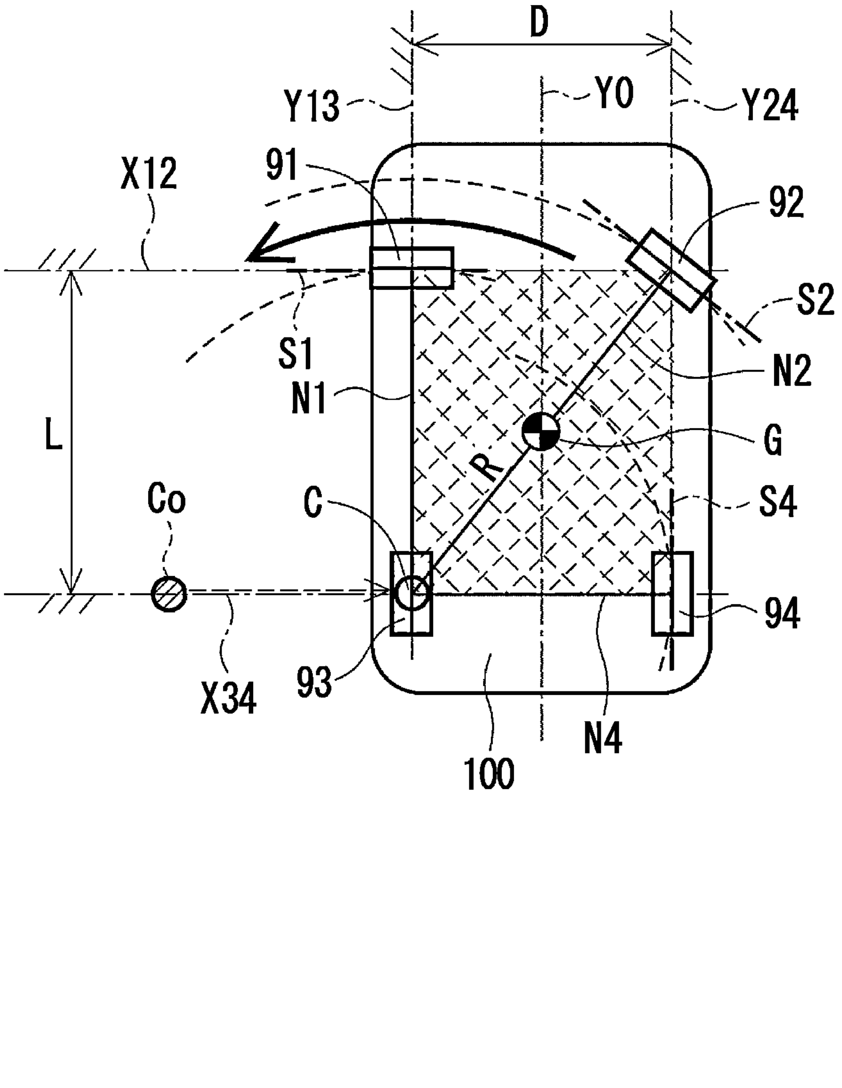
FIG. 12 is a diagram illustrating a turning center region in the non-forward turning mode (point turning)

FIGS. 10 and 12 show the turning center region (extended region) in the non-forward turning mode. The coordinate determination unit 66 determines the coordinates of one turning center C within the vehicle when the operation determination unit 65 commands the non-forward turning mode. The turning radius R in the non-forward turning mode is less than half the tread width D. That is, a relationship "$R < (D/2)$" holds true. As in the forward turning mode, the turning angle calculators 671-674 calculate the turning angle of each of the wheels 91-94 based on Ackermann theory so that the turning direction of each of the wheels 91-94 is perpendicular to the straight lines N1-N4 connecting the turning center C and the centers of each of the wheels 91-94.

As shown in FIG. 10, in a case of the spin turn, the turning center C coincides with the center of gravity G of the vehicle, and the turning radius R is "$R=0$". The four wheels 91-94 rotate on the same circle.

As shown in FIG. 12, in a case of the pivot turn, the turning center C coincides with the center of one of the wheels. For example, when the rear left wheel 93 is set as the turning center C, the turning direction of the front left wheel 91 is perpendicular to the straight line N1 on the left-front-rear wheel axis Y13 and faces straight sideways. That is, the turning angle becomes 90 degrees. The turning direction of the rear right wheel 94 is perpendicular to the straight line N4 on the rear wheel axis X34, and faces forward. That is, the turning angle becomes 0 degrees.

[3A] Lateral Movement Mode from Forward Movement

Figure 13:
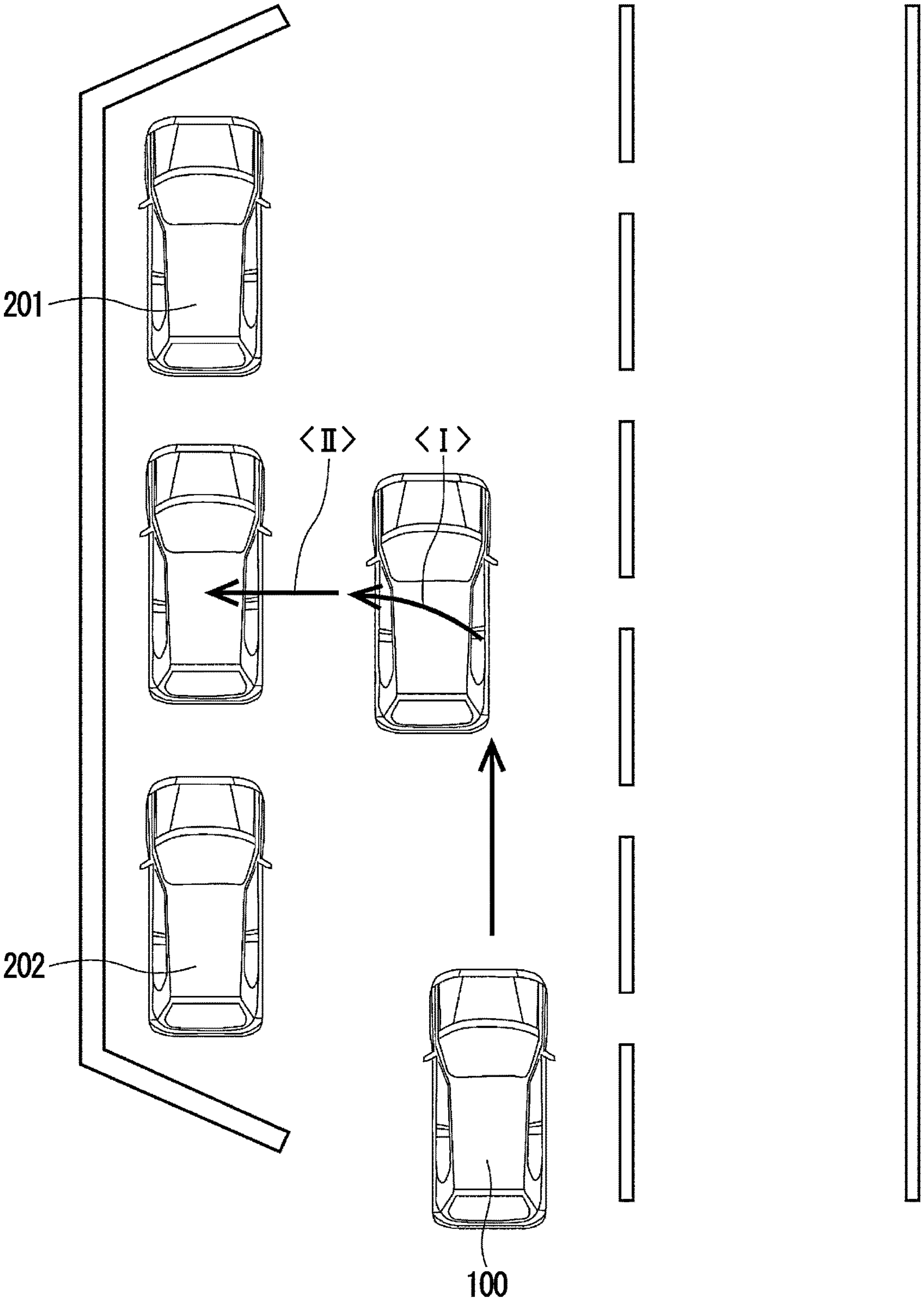
FIG. 13 is a diagram illustrating vehicle operation in a lateral movement mode from forward movement.

Next, the lateral movement mode from the forward movement will be described with reference to FIGS. 13 to 15. FIG. 13 shows an example of vehicle movement in the lateral movement mode from the forward movement.

Assume a situation in which the vehicle 100 is parallel parked in a space between other vehicles 201, 202 parked on the left side of a road. The vehicle 100 moving forward moves diagonally while facing straight in a travel direction, and then moves directly lateral to reach the target position.

Figure 14:
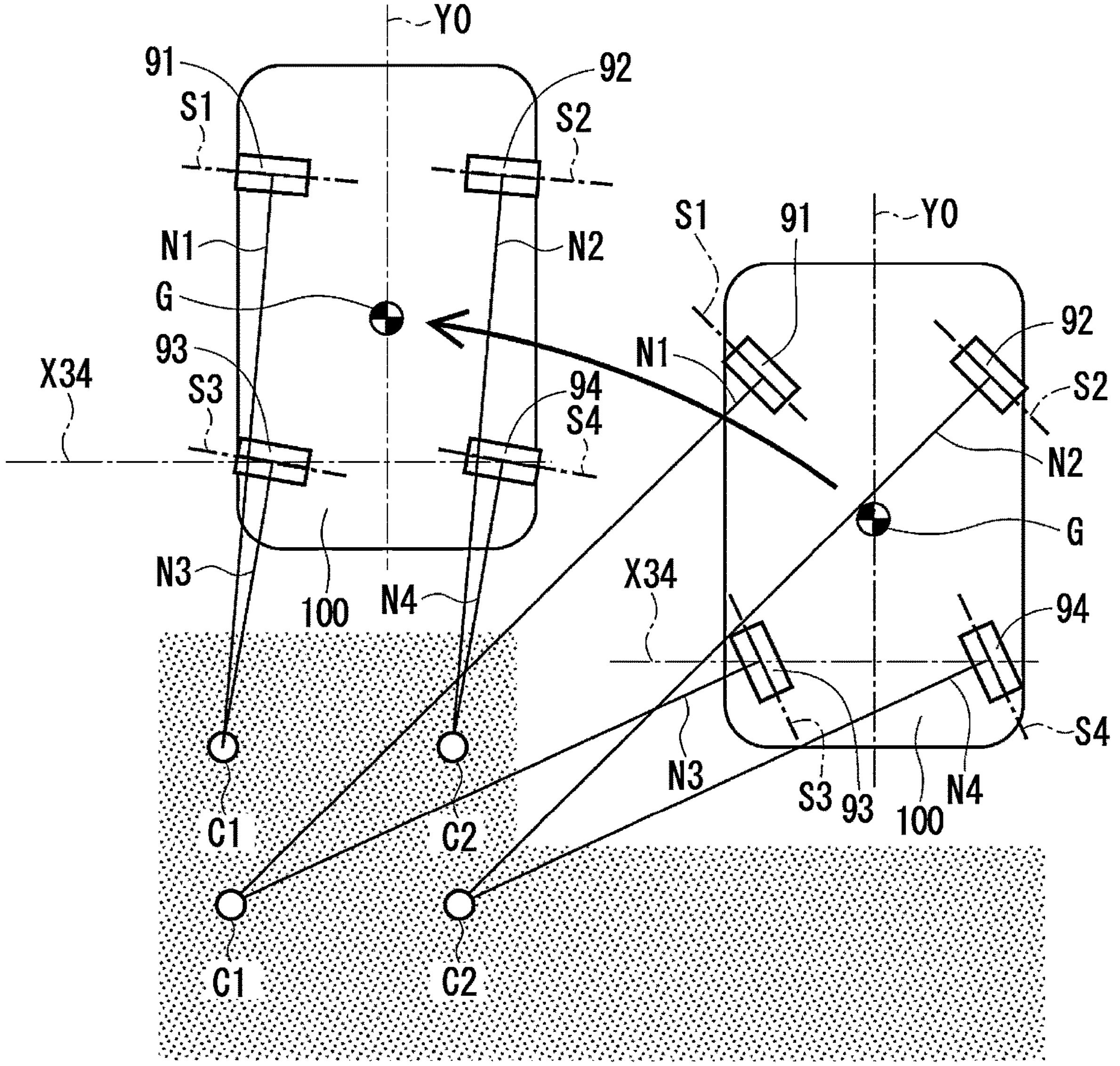
FIG. 14 is a diagram illustrating a turning center region in the lateral movement mode (when moving obliquely) from forward movement.

FIG. 14, 15 show the turning center region (extended region) in the lateral movement mode from the forward movement. In the lateral movement mode, the turning center C cannot be set so that a straight line perpendicular to the wheel width centerlines S1-S4 of the four wheels 91-94 intersects with each other at a single point. In other words, the lateral movement mode is a vehicle operation that goes beyond the concept of turning of the conventional non-independently steering vehicle 109, and requires further theoretical extension to the turning theory that is premised on a single turning center Co.

Therefore, the coordinate determination unit 66 determines the coordinates of two turning centers C1, C2 located rearward of the rear wheel axis X34 and separated in the left-right direction of the vehicle 100 when the operation determination unit 65 commands the lateral movement mode from the forward movement. A first turning center C1 is a turning center for the front and rear wheels 91, 93 on the inside of the turn. A second turning center C2 is a turning center for the front and rear wheels 92, 94 on the outside of the turn. Since there is no point in simply comparing it with the conventional turning center Co, dashed arrows pointing to the conventional turning center Co and the turning center C of the present embodiment are omitted in FIGS. 14, 15.

As shown in FIG. 14, the first and second turning centers C1, C2 are set at a left rear of the vehicle 100 when moving diagonally from the forward movement. As the vehicle 100 moves diagonally forward and to the left, the first and second turning centers C1, C2 approach directly behind the vehicle 100. Moreover, the turning angle of each of the wheels 91-94 gradually approaches 90 degrees. The vehicle 100 approaches the target position gradually while moving diagonally.

Figure 15:
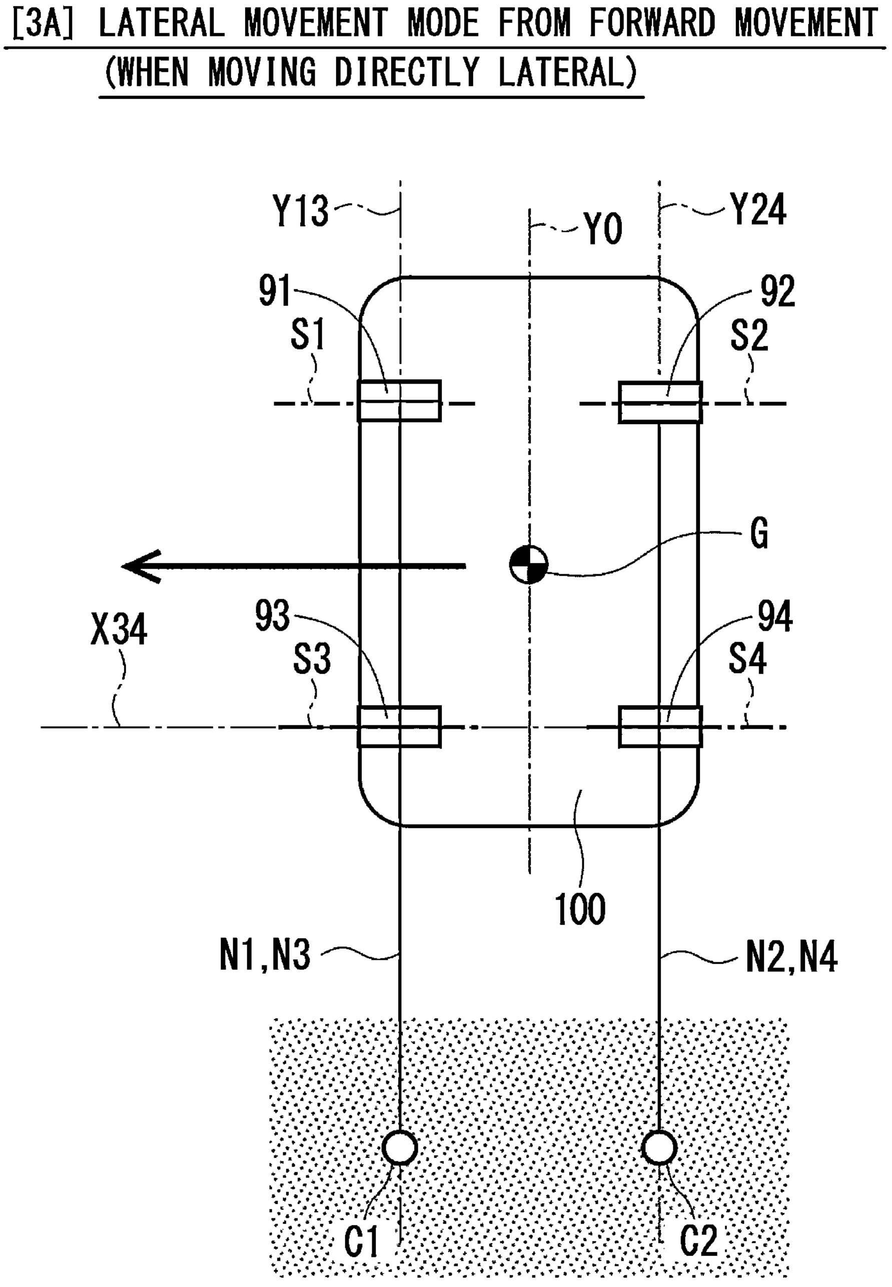
FIG. 15 is a diagram illustrating a turning center region in the lateral movement mode from forward movement (when moving directly lateral)

As shown in FIG. 15, the vehicle starts moving directly sideways when the turning angle of each of the wheels 91 to 94 reaches 90 degrees. The coordinate determination unit 66 determines the coordinates of the first turning center C1 on the front-rear wheel axis Y13 on the inside of the turning, and determines the coordinates of the second turning center C2 on the front-rear wheel axis Y24 on the outside of the turning. The wheel width centerlines S1, S3 of the front left wheel 91 and the rear left wheel 93 are perpendicular to the straight lines N1, N3 on the left-front-rear wheel axis Y13. The wheel width centerlines S2, S4 of the front right wheel 92 and the rear right wheel 94 are perpendicular to the straight lines N2, N4 on the right-front-rear wheel axis Y24. The vehicle 100 moves sideways to reach the target position.

[3B] Lateral Movement Mode from Backward Movement

Figure 16:
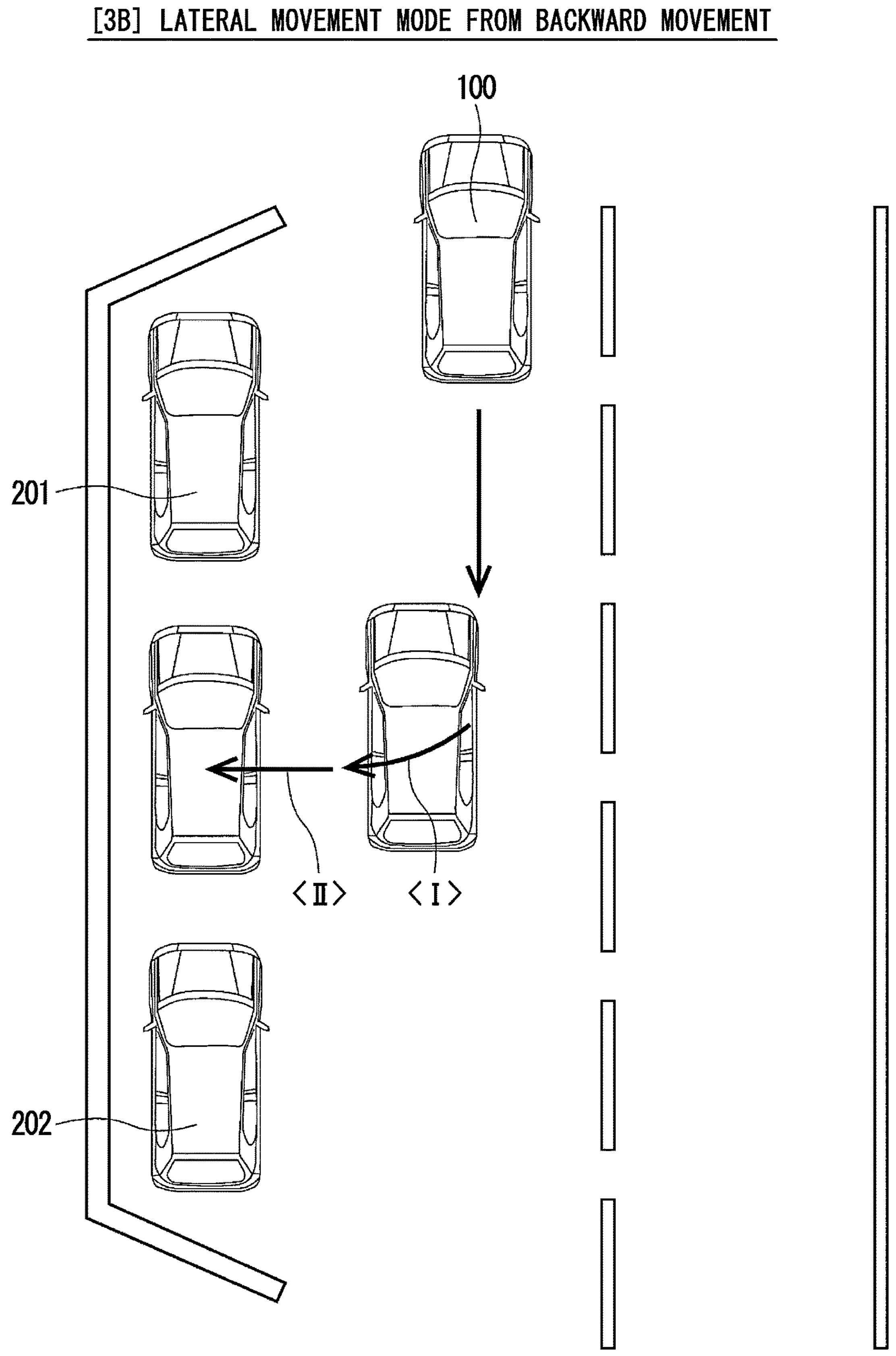
FIG. 16 is a diagram illustrating vehicle operation in the lateral movement mode from backward movement.
Figure 17:
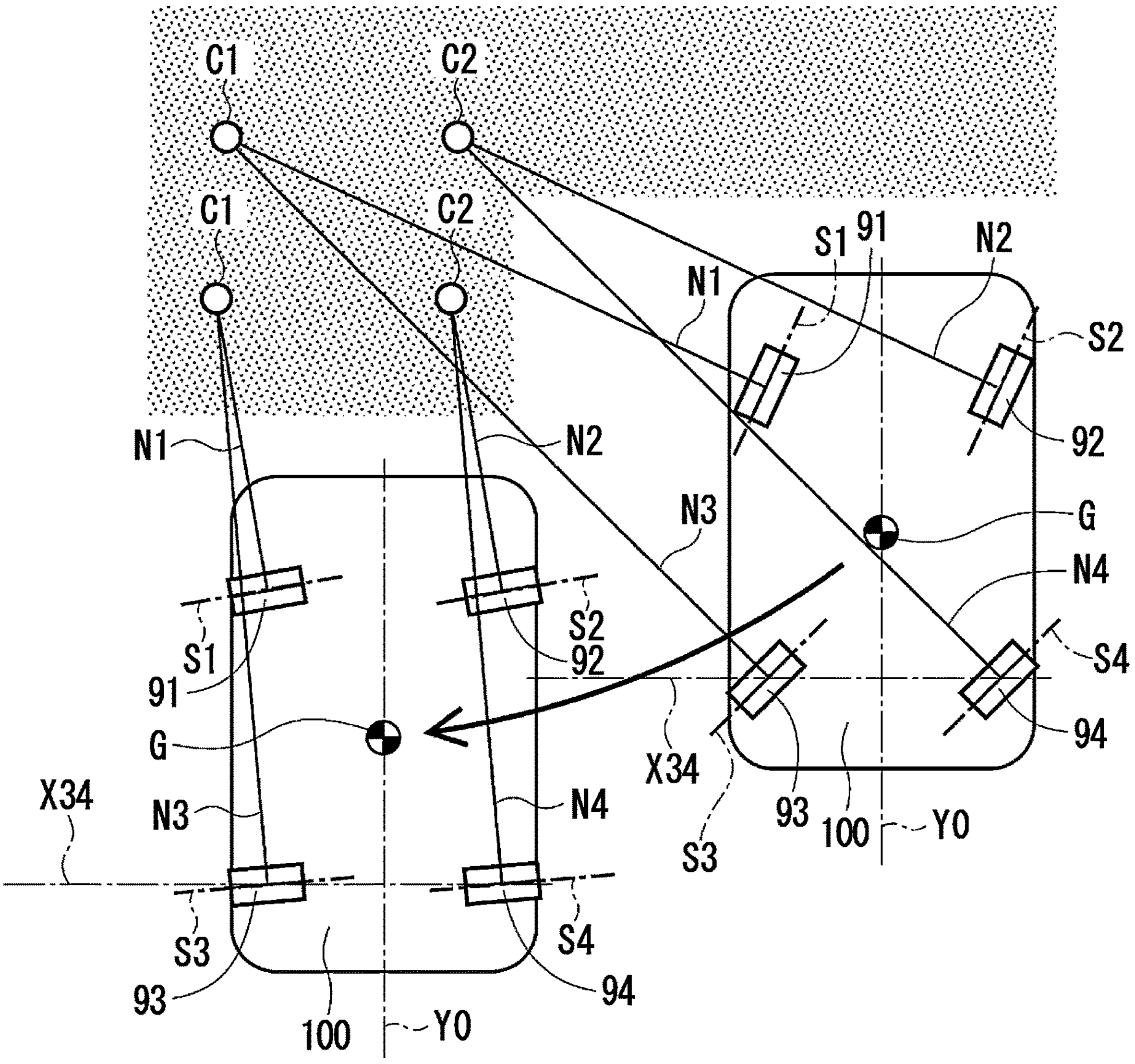
FIG. 17 is a diagram illustrating a turning center region in the lateral movement mode (when moving obliquely) from backward movement.
Figure 18:
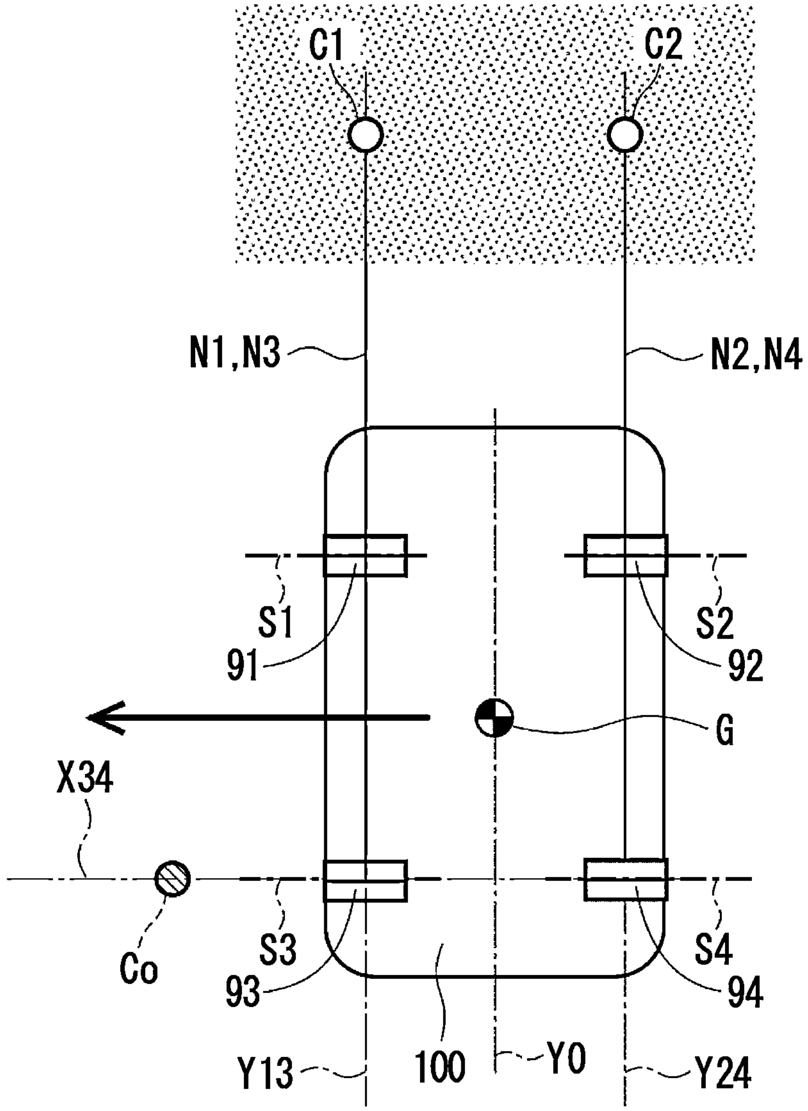
FIG. 18 is a diagram illustrating a turning center region in the lateral movement mode from backward movement (when moving directly lateral)

Next, the lateral movement mode from the backward movement will be described with reference to FIGS. 16 to 18. FIG. 16 to 18 are reversed versions of FIGS. 13 to 15, which relate to the lateral movement mode from the forward movement, and therefore basically follow the above description. FIG. 16 shows an example of vehicle operation in the lateral movement mode the backward movement. The vehicle 100 moving backward moves diagonally while facing straight in the travel direction, and then moves directly lateral to reach the target position.

FIG. 17, 18 show the turning center region (extended region) in the lateral movement mode from the backward movement. The coordinate determination unit 66 determines the coordinates of two turning centers C1, C2 located frontward of the front wheel axis X12 and separated in the left-right direction of the vehicle 100 when the operation determination unit 65 commands the lateral movement mode from the backward movement. A first turning center C1 is a turning center for the front and rear wheels 91, 93 on the inside of the turn. A second turning center C2 is a turning center for the front and rear wheels 92, 94 on the outside of the turn.

As shown in FIG. 17, the first and second turning centers C1, C2 are set at the left front of the vehicle 100 when moving diagonally from the backward movement. As the vehicle 100 moves diagonally backward and to the left, the first and second turning centers C1, C2 approach directly front the vehicle 100. Moreover, the turning angle of each of the wheels 91-94 gradually approaches −90 degrees.

As shown in FIG. 18, the vehicle starts moving directly lateral when the turning angle of each of the wheels 91 to 94 reaches −90 degrees. The coordinate determination unit 66 determines the coordinates of the first turning center C1 on the front-rear wheel axis Y13 on the inside of the turning, and determines the coordinates of the second turning center C2 on the front-rear wheel axis Y24 on the outside of the turning.

[3C] Lateral Movement Mode from Stop

Figure 19:
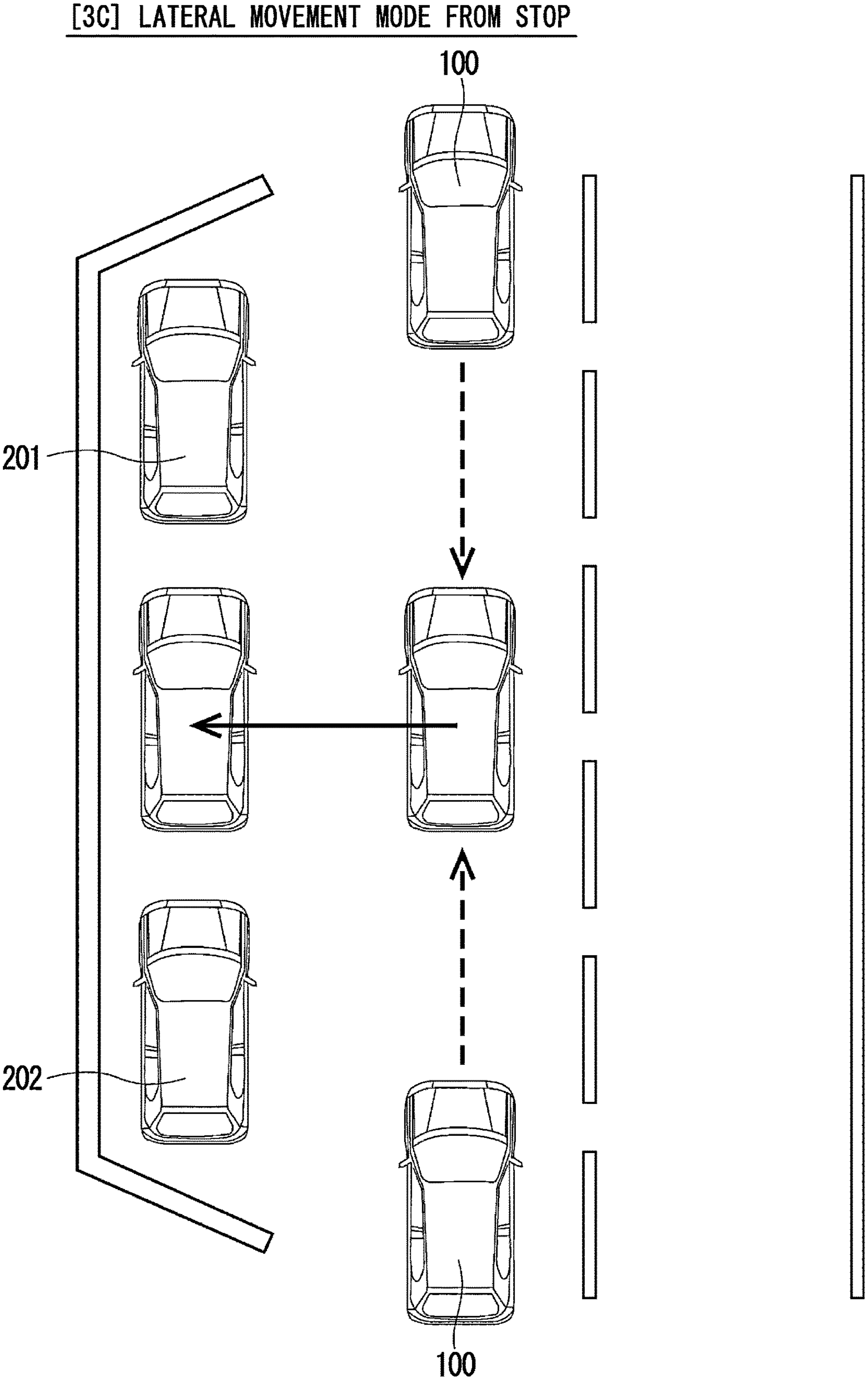
FIG. 19 is a diagram illustrating vehicle operation the lateral movement mode from a stop.

An example of vehicle operation in the lateral movement mode from a stop is shown in FIG. 19. In the same parallel parking situation as in [3A] and [3B], a situation is assumed in which the vehicle moves forward or backward to a position directly beside the parking space, stops once, and then moves directly beside the parking space with the turning angle of all wheels 91-94 set to ±90 degrees. This vehicle operation is equivalent to the absence of the diagonal movement stage of [3A] and [3B], and only lateral movement being performed. Therefore, similar to the case of lateral movement as shown in FIG. 15, 18, the coordinate determination unit 66 determines the coordinates of the first turning center C1 on the front-rear wheel axis Y13 on the inside of the turn, and determines the coordinates of the second turning center C2 on the front-rear wheel axis Y24 on the outside of the turn.

Figure 20:
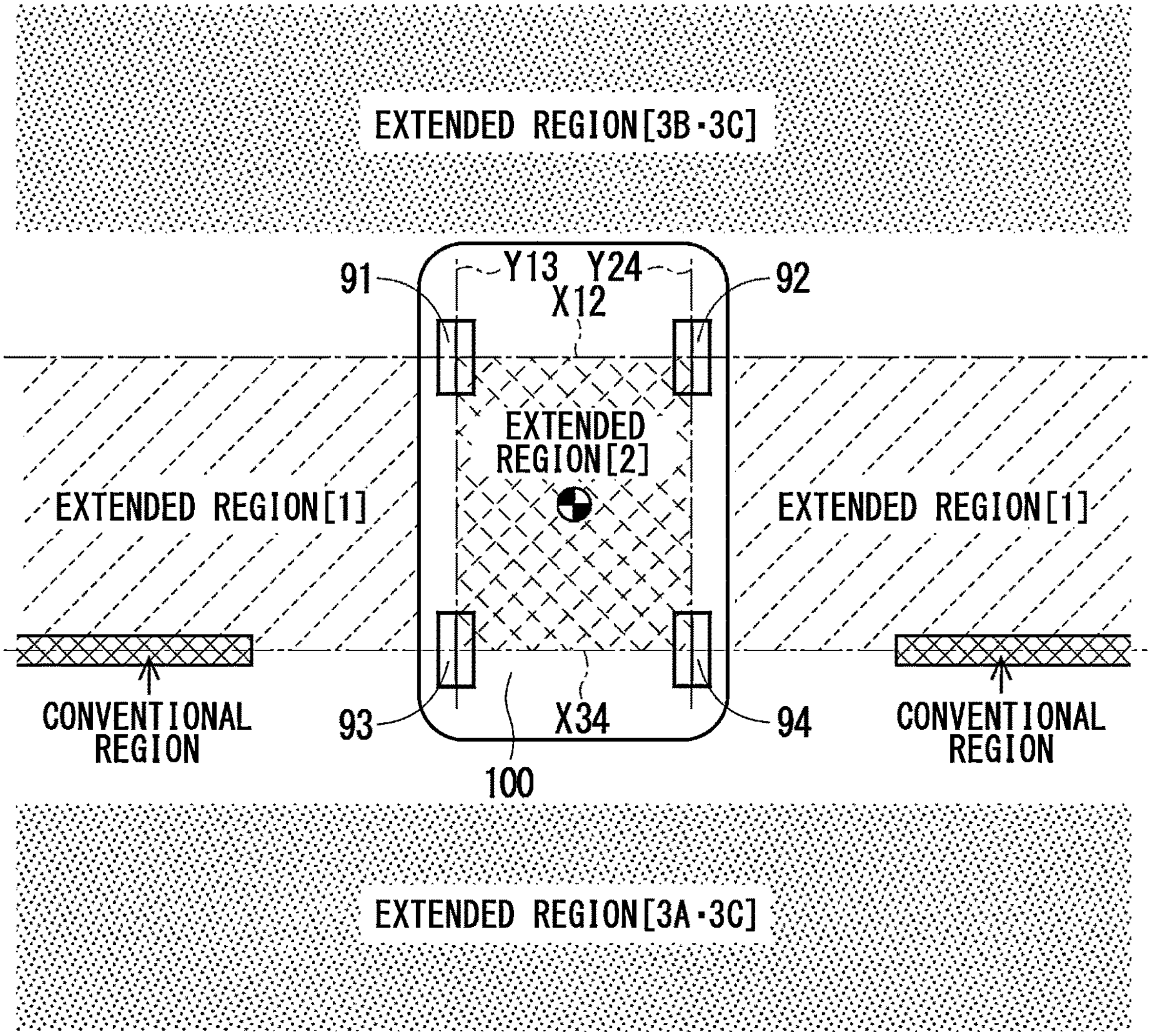
FIG. 20 is a diagram summarizing turning center regions (extended regions) for each vehicle operation mode.

FIG. 20 is a diagram summarizing turning center regions (extended regions) in each vehicle operation mode. As described above with reference to FIG. 4, the conventional turning center Co can be set only outside the limit positions on the rear wheel axis X34. This limits a range of the vehicle motion in which the benefits of Ackermann steering geometry can be utilized.

In contrast, in the present embodiment, an area on the inside of the turn and outside the vehicle between the front wheel axis X12 and the rear wheel axis X34 becomes the extended region [1] in the forward turning mode. In addition, an area inside the vehicle becomes the extended region [2] in the non-forward turning mode. Furthermore, an area behind the rear wheel axis X34 becomes the extended region [3A, 3C] in the forward or lateral movement mode from the stop, and an area ahead of the front wheel axis X12 becomes the extended region [3B, 3C] in the backward movement or the lateral movement mode from the stop. Therefore, degree of freedom in setting the turning center C according to the vehicle operation to be realized is increased.

Figure 21:
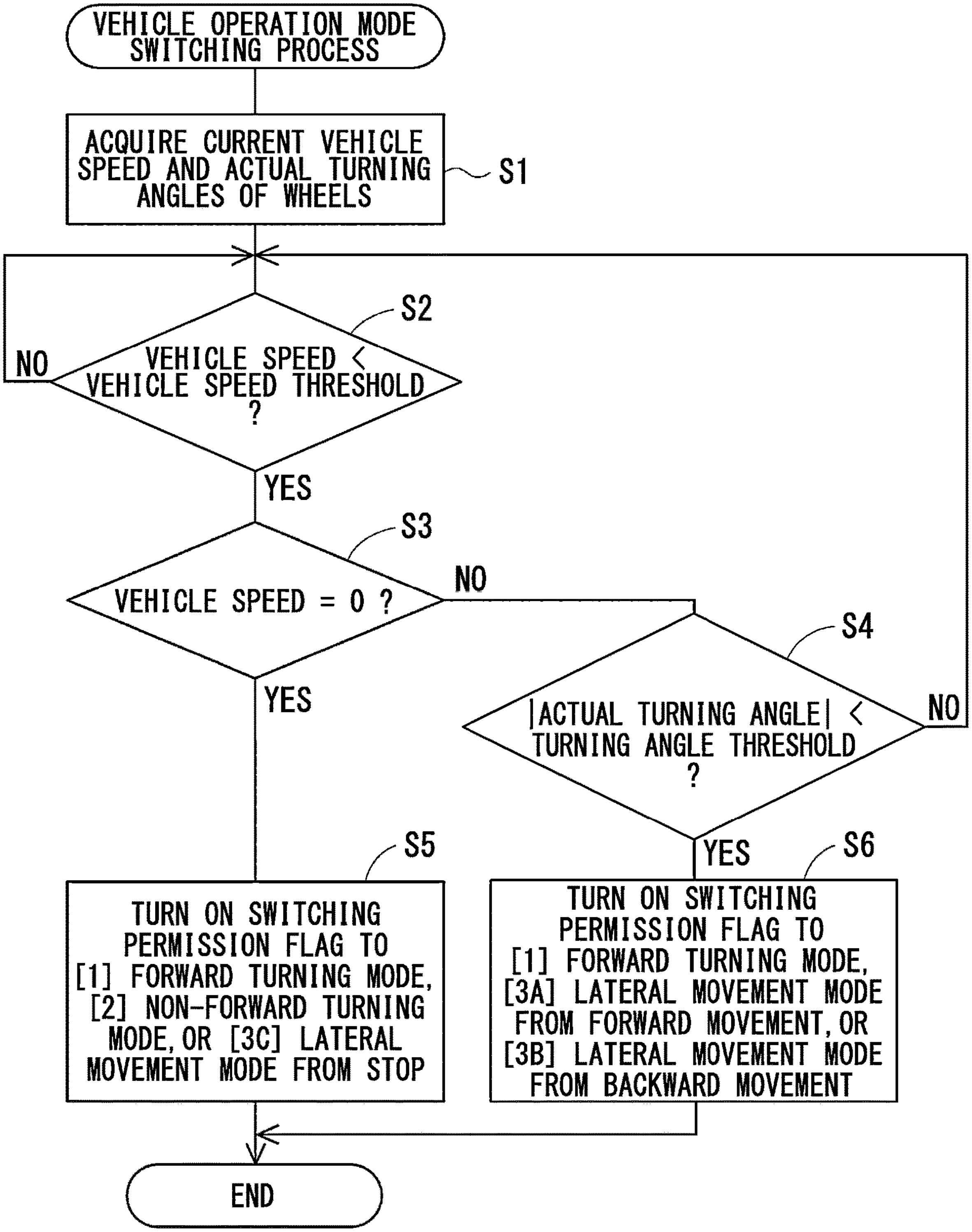
FIG. 21 is a flowchart of a switching determination process of a vehicle operation mode.

The vehicle operation mode switching process performed by the operation determination unit 65 will be described with reference to the flowchart of FIG. 21. The operation determination unit 65 determines whether the vehicle operation mode can be appropriately switched between the forward turning mode, the non-forward turning mode, and the lateral movement mode depending on the current vehicle state, and if switching is possible, turns on a switching permission flag. When the vehicle operation mode is switched, the coordinate determination unit 66 determines the coordinates of the turning center in the new extended region.

On the other hand, when the operation determination unit 65 determines that the vehicle operation mode cannot be appropriately switched, the switching permission flag is not turned on, and the current vehicle operation mode is maintained. The coordinate determination unit 66 is capable of freely moving the coordinates of the turning center within the current extended region. In the following flowchart, a symbol S indicates a step.

In step S1, the operation determination unit 65 acquires a current vehicle speed and actual turning angles of the wheels 91-94. Furthermore, the operation determination unit 65 calculates, for example, an average value or a value with a maximum absolute value among the actual turning angles of the four wheels as an evaluation value.

In step S2, it is determined whether the vehicle speed is lower than a vehicle speed threshold, for example, a few kilometers per hour. When the vehicle is traveling at a very low speed or stopped, the answer in step S2 is YES, and the process proceeds to step S3. In step S3, it is determined whether the vehicle speed is 0, that is, whether the vehicle is stopped. When the vehicle is stopped, the answer in step S3 is YES and the process proceeds to step S5. At low speeds (several km/hr or more) to medium to high speeds, the answer is NO in step S2.

When the vehicle is not stopped but is moving, the result is NO in step S3, and it is determined in step S4 whether an absolute value of the actual turning angle is smaller than a turning angle threshold. For example, when starting a turn from straight ahead, the answer in step S4 is YES and the process proceeds to step S6. When returning from a turning motion to a straight motion, when the wheels have not returned to a straight position, the answer in step S4 is NO.

In step S5, the operation determination unit 65 turns on the switching permission flag to [1] the forward turning mode, [2] the non-forward turning mode, or [3C] the lateral movement mode from the stop. This enables the coordinate determination unit 66 to determine the coordinates of the turning center C in the extended regions [1], [2], and [3C].

In step S6, the operation determination unit 65 turns on the switching permission flag to [1] the forward turning mode, [3A] the lateral movement mode from the forward movement, or [3B] the lateral movement mode from the backward movement. This enables the coordinate determination unit 66 to determine the coordinates of the turning center C in the extended regions [1], [3A], and [3B].

When the answer is NO in S2 or S4, the switching permission flag is not turned on and the routine returns to before step S1 and is repeated. That is, the current vehicle operation mode is maintained until the vehicle comes to the stop or travels substantially straight ahead at an extremely low speed.

Next, determination of the coordinates of the turning center C by the coordinate determination unit 66 will be described with reference to FIG. 22. There are several ideas about where to set an origin of a coordinate system. For example, the turning center C may be set as the origin, but since the coordinates of each wheel 91-94 viewed from the turning center C change from moment to moment, the turning angle must be constantly corrected, requiring a huge amount of calculation.

Therefore, preferably, the coordinate determination unit 66 determines the coordinates of the turning center C with the center of gravity G of the vehicle 100 as the origin. The coordinates of each wheel 91-94 viewed from the center of gravity G are defined using the tread width and the wheelbase. By setting the coordinates of the turning center C as variables, the turning angles of the wheels 91-94 can be described by a simple calculation formula. It can also be used in all extended regions.

Figure 22:
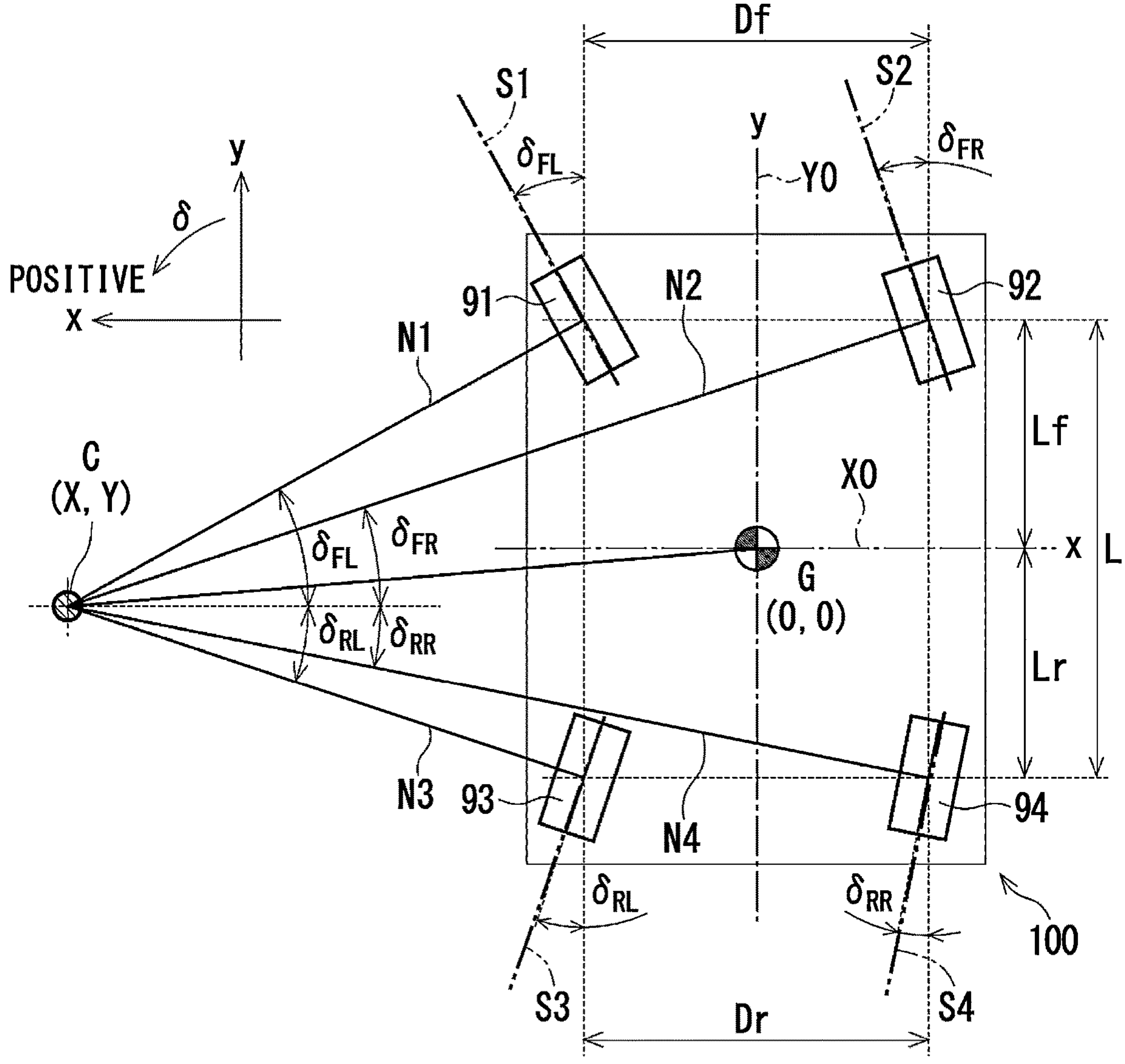
FIG. 22 is a diagram for explaining a calculation formula for a turning angle using coordinates with a center of gravity as an origin.

As shown in FIG. 22, an X-Y coordinate system is defined in which the center of gravity G of the vehicle is the origin (0, 0), the gravity axis X0 is the x-axis, and the vehicle longitudinal axis Y0 is the y-axis. On the x-axis, the right side of the center of gravity G is positive and the left side is negative, and on the y-axis, the front side of the center of gravity G is positive and the rear side is negative. The coordinates of the turning center are defined as (X, Y). In a case of a left turn, "X<0" and in a case of a right turn, "X>0".

The tread width of the front wheels 91, 92 is represented as Df, and the tread width of the rear wheels 93, 94 is represented as Dr. In addition, in the wheelbase L, a distance from the gravity axis X0 to the front wheel axis X12 is defined as a front-wheel axis distance Lf, and a distance from the gravity axis X0 to the rear wheel axis X34 is defined as a rear-wheel axis distance Lr. Values of Df, Dr, Lf, and Lr are stored as vehicle characteristics.

The turning angle calculators 671-674 calculate tangent values of the turning angles δFL, δFR, δRL, δRR of each wheel 91-94 using equations (0.1)-(0.4) so that the turning direction of each wheel 91-94 is perpendicular to the straight line N1-N4 connecting the turning center C and the center of each wheel 91-94. The turning angle is expressed as a positive angle in a counterclockwise direction from a neutral position and a negative angle in a clockwise direction from a neutral position. Subscripts "FL, FR, RL, and RR" in FIG. 22 are written in regular characters in the specification.

$$\tan\delta FL = (Y - Lf)/\{X + (Df/2)\} \tag{0.1}$$

$$\tan\delta FR = (Y - Lf)/\{X - (Df/2)\} \tag{0.2}$$

$$\tan\delta RL = (Y + Lr)/\{X + (Dr/2)\} \tag{0.3}$$

$$\tan\delta RR = (Y + Lr)/\{X - (Dr/2)\} \tag{0.4}$$

[Determination of Turning Center Coordinates]

In a basic configuration of the operation command device 601 of the first embodiment described above, the turning angle calculators 671-674 calculate command values for the turning angles δFL, δFR, δRL, δRR of each of the wheels 91-94 based on the coordinates of the turning center C determined by the coordinate determination unit 66. The coordinates of the turning center C can be determined without any constraints when all of the wheels 91-94 can be steered within a range of ±90 degrees.

However, steering modules for independently steering vehicles are available in various configurations depending on using of vehicles, and depending on a structure of the steering module, a maximum turning angle may be less than 90 degrees. In the following description, a term "maximum turning angle" refers to a turning angle whose absolute value is maximum, regardless of reference numerals. For example, "maximum turning angle 90 degrees" means that the vehicle can be steered within a range from a turning angle of −90 degrees to the right to a turning angle of 90 degrees to the left.

For example, a steering module having an integrated structure in which a steering motor is attached to an inside of a wheel is a "small steering module" with a maximum turning angle of about 45 degrees. A rack bar type steering module is a "medium steering module" with a maximum turning angle of approximately 70 degrees. As shown in FIG. 2, an arm-type steering module in which a rotation of a steering motor provided above the wheels is transmitted to the wheels via an arm is a "large steering module" with a maximum turning angle of 90 degrees or more.

When the basic configuration of the operation command device 601 is applied to a vehicle with a small steering module or a medium steering module, even if the coordinates of the turning center C are determined based on the vehicle operation mode and then the turning angle command value for each wheel is calculated, there may be cases where the turning angle is mechanically impossible to realize. Alternatively, even if the turning angle is within a range below the mechanical maximum turning angle, the maximum turning angle may be temporarily limited due to an abnormality in the steering actuator at that time, an electric current limit, or the like. In particular, when turning according to Ackermann steering geometry, a bottleneck that determines a limit of vehicle movement is the maximum turning angle of the wheel on the inside of the turn.

It is also possible to consider a control configuration in which, if the calculated turning angle command value is not feasible, the coordinates of the turning center C are determined again. However, when the turning angle that the inside wheel can achieve is determined in advance, it is more efficient for the coordinate determination unit 66 to determine the coordinates of the turning center C based on the turning angle of the inside wheel. After the coordinate determination unit 66 has determined the coordinates of turning center C, the turning angle calculators 671-674 calculate the turning angle command value for the turning angle of the outside wheel as in the basic configuration.

Figure 23:
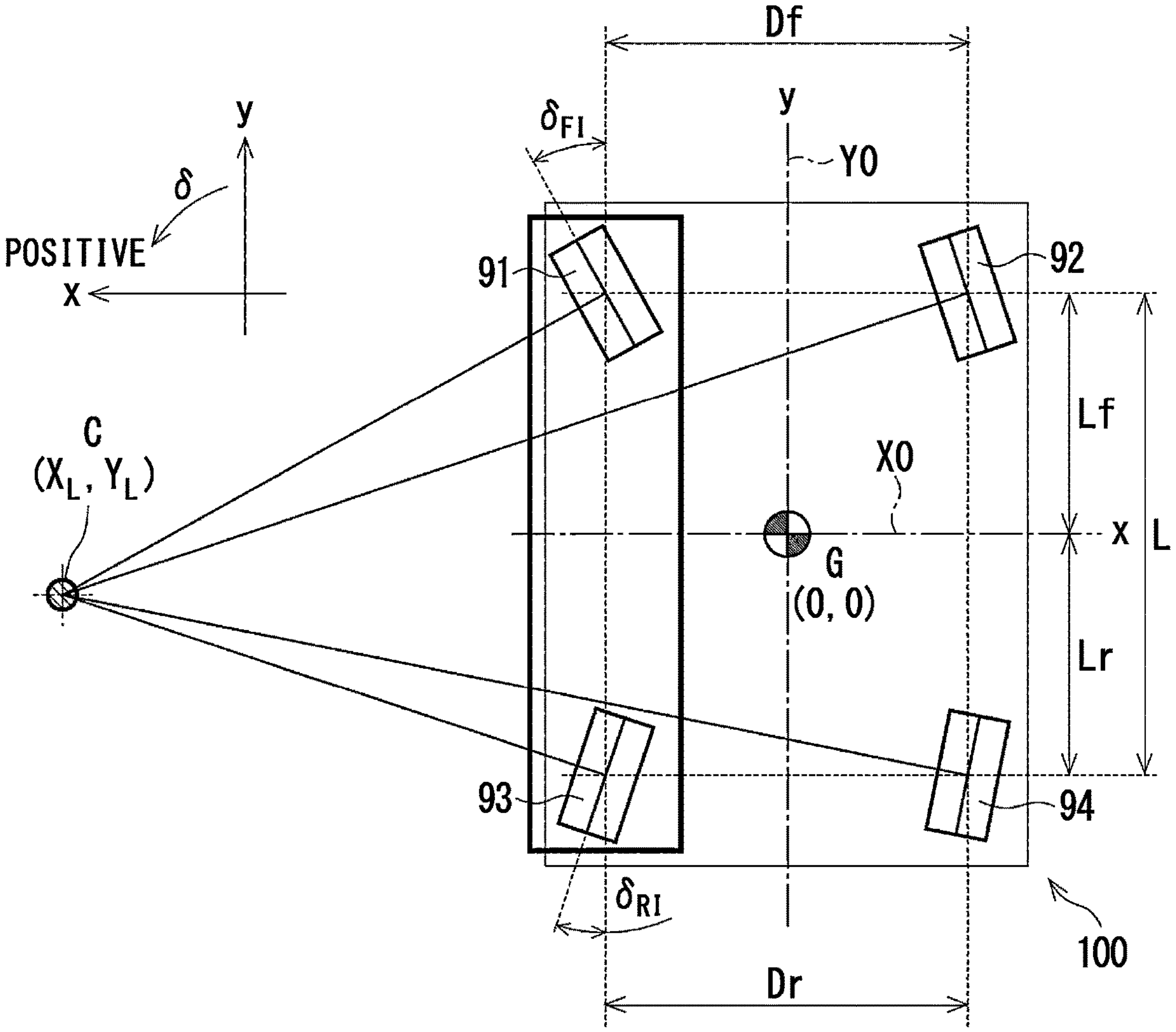
FIG. 23 is a diagram for explaining determination of turning center coordinates when turning left.
Figure 24:
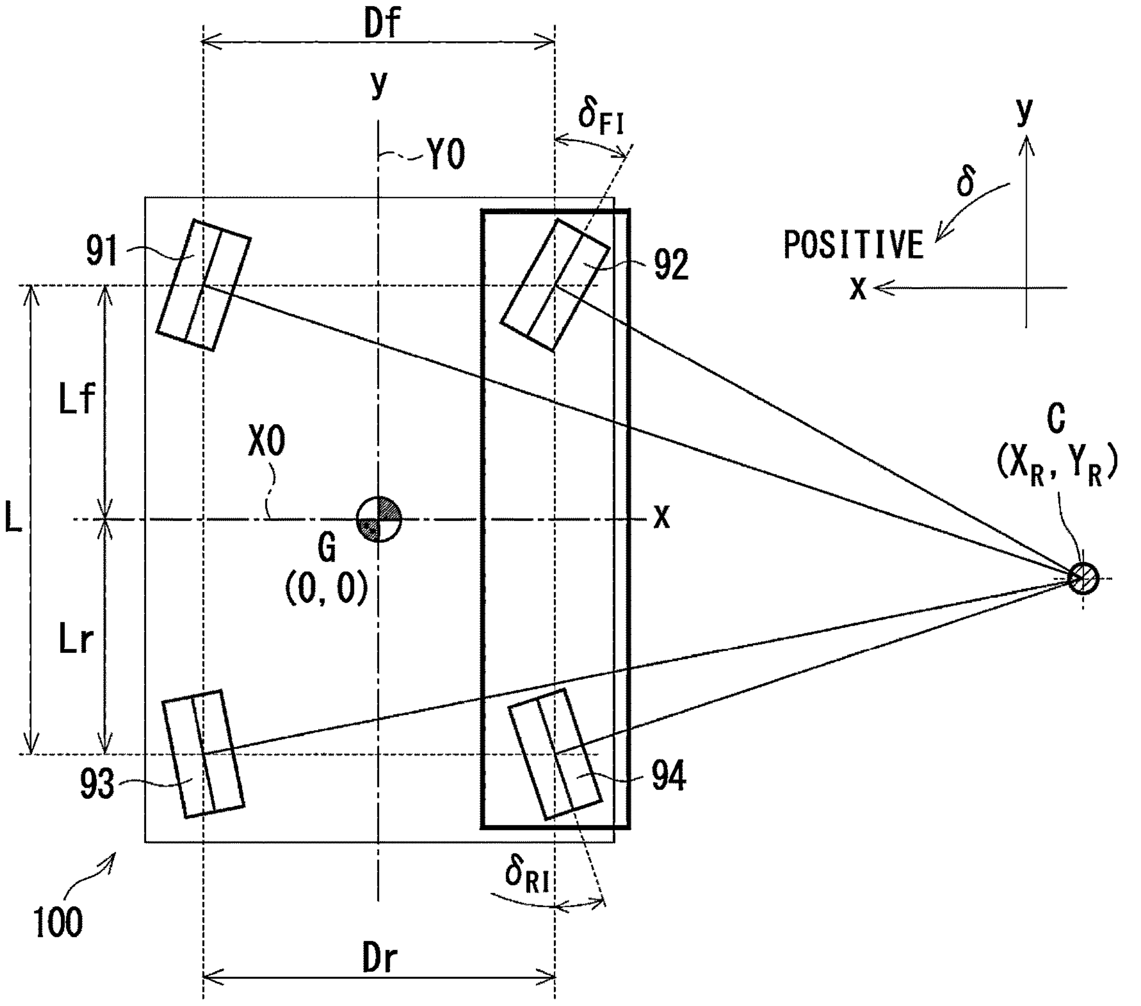
FIG. 24 is a diagram for explaining determination of the turning center coordinates when turning right.

Next, a control configuration for determining the coordinates of the turning center C according to a preferred embodiment will be described with reference to FIGS. 23, 24. FIG. 23 is a diagram for explaining calculation of the coordinates of the turning center C when turning left, and FIG. 24 is a diagram for explaining calculation of the coordinates of the turning center C when turning right. This control configuration is applied to a four-wheeled vehicle 100 including two front wheels 91, 92 and two rear wheels 93, 94, and is premised on a fact that the four-wheeled vehicle 100 performs a turning operation according to Ackermann steering geometry.

Of the front wheels 91, 92 and the rear wheels 93, 94, the wheel closer to the turning center C is defined as an "inner front wheel" and an "inner rear wheel". As shown by a thick line frame in FIG. 23, when turning left, the front left wheel 91 becomes the inner front wheel and the rear left wheel 93 becomes the inner rear wheel. As shown by a thick line frame in FIG. 24, when turning to the right, the front right wheel 92 becomes the inner front wheel and the rear right wheel 94 becomes the inner rear wheel. The turning angle of the inner front wheel is represented as δFI, and the turning angle of the inner rear wheel is represented as δRI. Subscripts "FL, FR, RL, RR" in FIGS. 23, 24 are written in regular characters in the specification.

It is assumed that the turning angle δFI of the inner front wheel and the turning angle δRI of the inner rear wheel have been determined before the coordinates of the turning center C are determined by the coordinate determination unit 66. In this case, the coordinate determination unit 66 determines the coordinates of the turning center C of the vehicle based on the turning angle δFI of the inner front wheel, the turning angle δRI of the inner rear wheel, the front-wheel axis distance Lf, the rear-wheel axis distance Lr, the front wheel tread width Df, and the rear wheel tread width Dr.

The coordinate determination unit 66 uses the X-Y coordinates similar to those in FIG. 22, and defines whether the turning angle is positive or negative in the same manner as in FIG. 22. It is also assumed that the turning angle δFI of the inner front wheel and the turning angle SRI of the inner rear wheel satisfy a relationship "δFI≠δRI, −90°<δFI<90°, and −90°<δRI<90°". This assumption is necessary to prevent denominators from becoming zero and tangent values from diverging to infinity in the following equations (1) to (4).

Examples for each vehicle operation mode will be described later, but the following formulas are commonly applied to calculating the coordinates of the turning center C in the forward turning mode and the non-forward turning mode, as well as the coordinates of the first turning center C1 for the inner front wheel and the inner rear wheel in the lateral movement mode.

Coordinates (XL, YL) of the turning center C or the first turning center C1 during a left turn are calculated by the following equations (1) and (2). Subscripts "FL, FR, RL, RR" in FIG. 23 are written in regular characters in the specification.

[Math 1]

$$X_L = \frac{-\frac{1}{2}(Df\tan\delta_{FI} - Dr\tan\delta_{RI}) - (Lf + Lr)}{\tan\delta_{FI} - \tan\delta_{RI}} \tag{1}$$

$$Y_L = \left\{\frac{-\frac{1}{2}(Df\tan\delta_{FI} - Dr\tan\delta_{RI}) - (Lf + Lr)}{\tan\delta_{FI} - \tan\delta_{RI}} + \frac{Df}{2}\right\}\tan\delta_{FI} + Lf \tag{2}$$

Coordinates (XR, YR) of the turning center C or the first turning center C1 during a right turn are calculated using the following equations (3) and (4). Subscripts "FL, FR, RL, RR" in FIG. 24 are written in regular characters in the specification.

[Math 2]

$$X_R = \frac{\frac{1}{2}(Df\tan\delta_{FI} - Dr\tan\delta_{RI}) - (Lf + Lr)}{\tan\delta_{FI} - \tan\delta_{RI}} \tag{3}$$

$$Y_R = \left\{\frac{\frac{1}{2}(Df\tan\delta_{FI} - Dr\tan\delta_{RI}) - (Lf + Lr)}{\tan\delta_{FI} - \tan\delta_{RI}} - \frac{Df}{2}\right\}\tan\delta_{FI} + Lf \tag{4}$$

Equation (1) is obtained by eliminating Y from equations (0.1) and (0.3) in FIG. 22. Substituting equation (1) into equation (0.1) and rearranging, equation (2) is obtained. Equation (3) can be obtained by eliminating Y from equations (0.2) and (0.4) in FIG. 22. Substituting equation (3) into equation (0.2) and rearranging, equation (4) is obtained.

Here, the above equations (1) to (4) are formulas obtained on the premise of the definitions of the X-Y coordinates with the center of gravity G as the origin and positive and negative turning angles used in FIGS. 22 to 24. Coordinates of the turning center C or the first turning center C1 may be calculated using an equation that assumes other coordinates and a positive/negative definition of the turning angles, and has as parameters the turning angles δFI, δRI of the front and rear wheels on the inside of the turn, the front-wheel axis distance Lf, the rear-wheel axis distance Lr, the front wheel tread width Df, and the rear wheel tread width Dr.

As shown in FIGS. 25 to 35 (excluding FIG. 30), there are examples in which the coordinates of the turning center C are determined based on the turning angle δFI of the inner front wheel, the turning angle δRI of the inner rear wheel in each vehicle operation mode. These examples are for a left turn, and the coordinates (XL, YL) of the turning center C are calculated by equations (1) and (2). When turning left, "XL<0".

Figure 32:
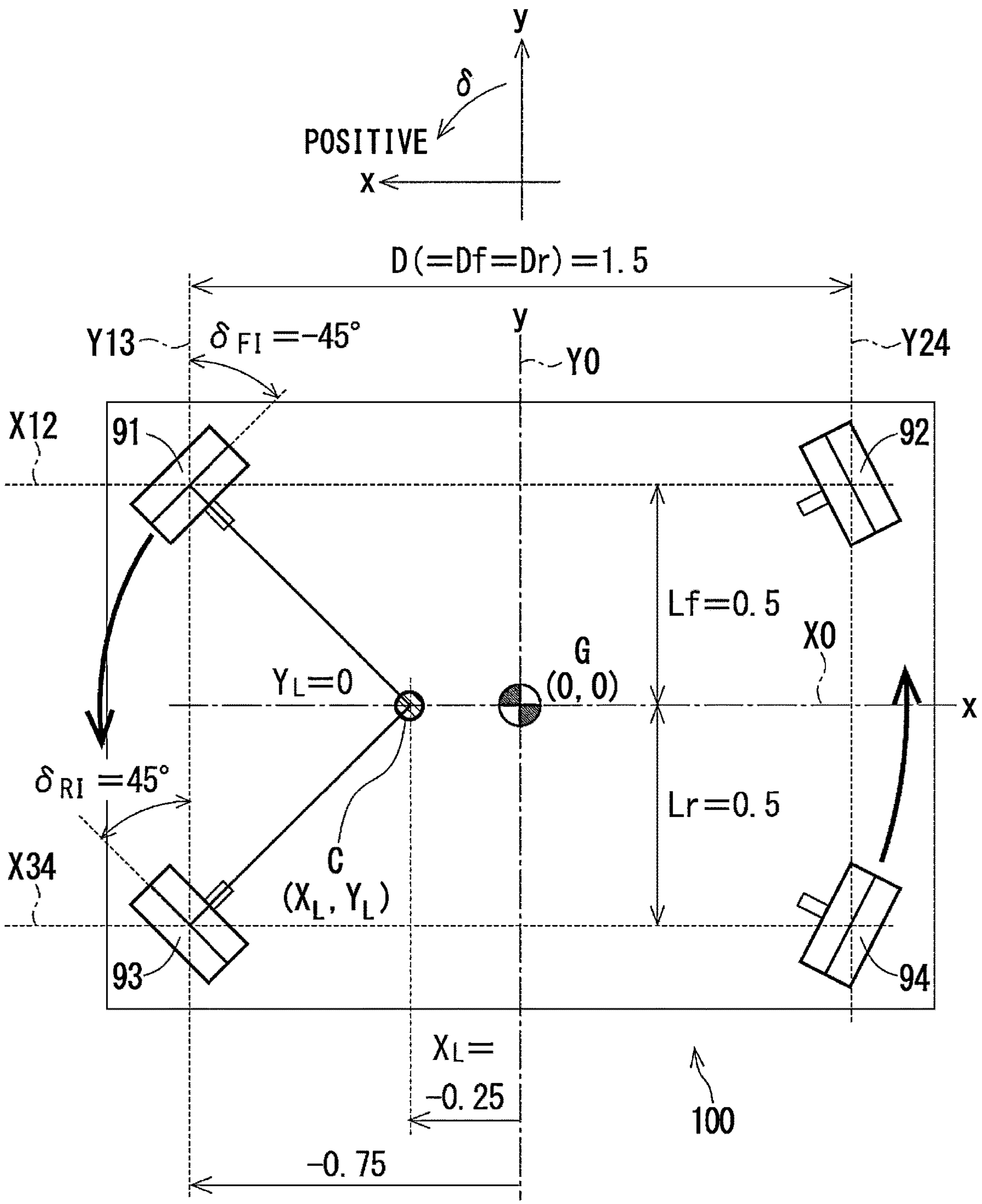
FIG. 32 is a diagram of a third example for determining the turning center coordinates in the non-forward turning mode.

To simplify calculations, the front wheel tread width Df and the rear wheel tread width Dr of the vehicle 100 are assumed to be equal, and the tread width D of the front wheel axle and rear wheel axis (=Df=Dr) is set to 1 except in FIG. 32. Further, the front-wheel axis distance Lf and the rear-wheel axis distance Lr are set to 0.5. That is, the wheelbase L (=Lf+Lr) is 1, and the centers of the four wheels 91-94 are disposed at vertices of a square with the center of gravity G as the center. Values "1" and "0.5" indicate a unit length in lengths (meters). For example, "1" corresponds to a length of 1.5 or 2 meters.

The steering modules 81-84 equipped in the vehicle 100 are assumed to be of three types: [a] a small steering module (equivalent to a maximum turning angle of 45 degrees), [b] a medium steering module (equivalent to a maximum turning angle of 70 degrees), and [c] a large steering module (equivalent to a maximum turning angle of 90 degrees or more). However, for the large steering module, the following examples will deal with a maximum turning angle range of less than 90 degrees. For example, "less than 90 degrees" may correspond to 89.5 degrees or less, or may correspond to 89.9 degrees or less, depending on the practical minimum resolution. In this example, "less than 90 degrees" is treated as "89 degrees or less" in increments of 1 degrees.

[1] Forward Turning Mode

Figure 25:
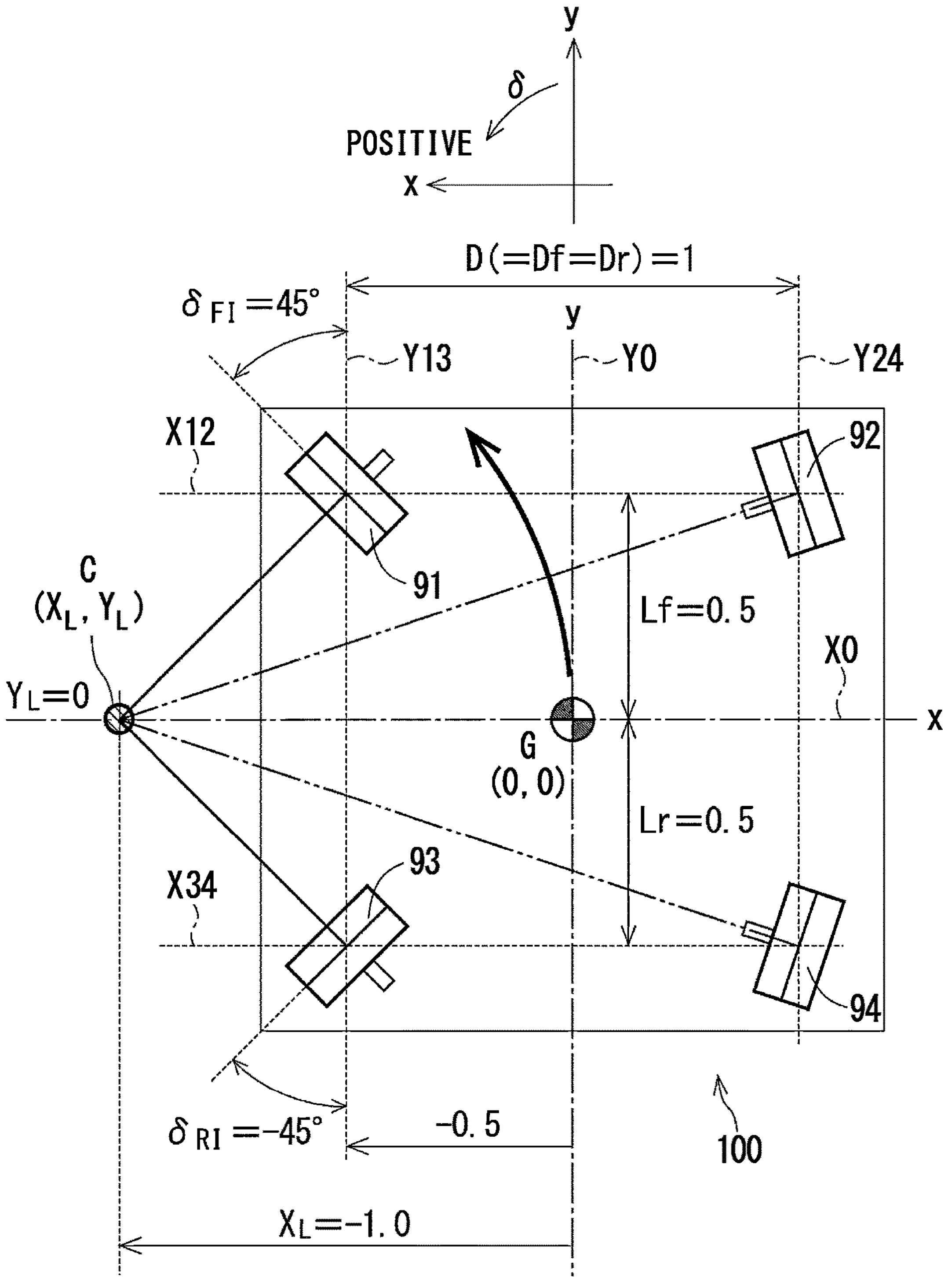
FIG. 25 is a diagram of a first example of determining the turning center coordinates in the forward turning mode.
Figure 26:
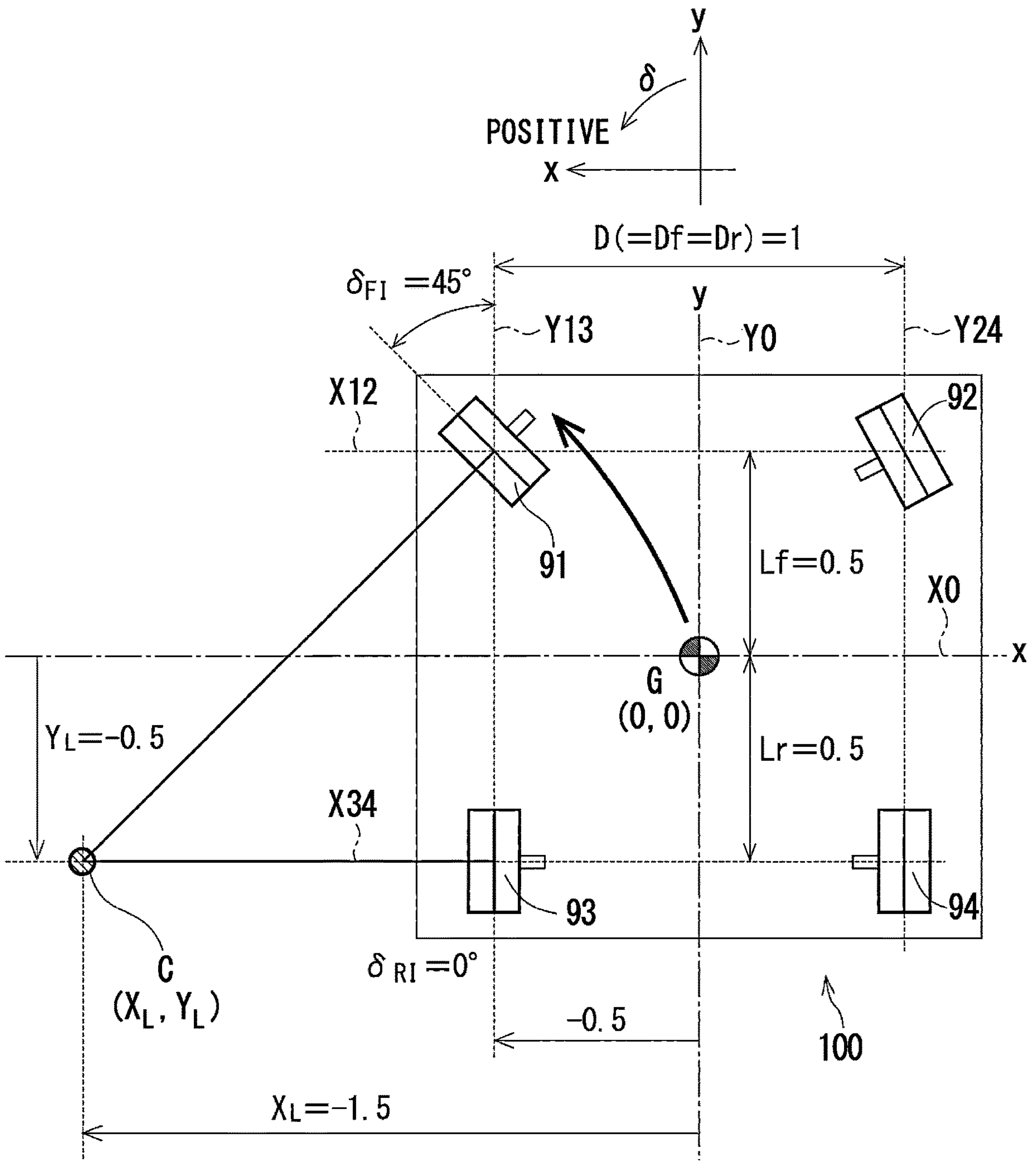
FIG. 26 is a diagram of a second example for determining the turning center coordinates in the forward turning mode.
Figure 27:
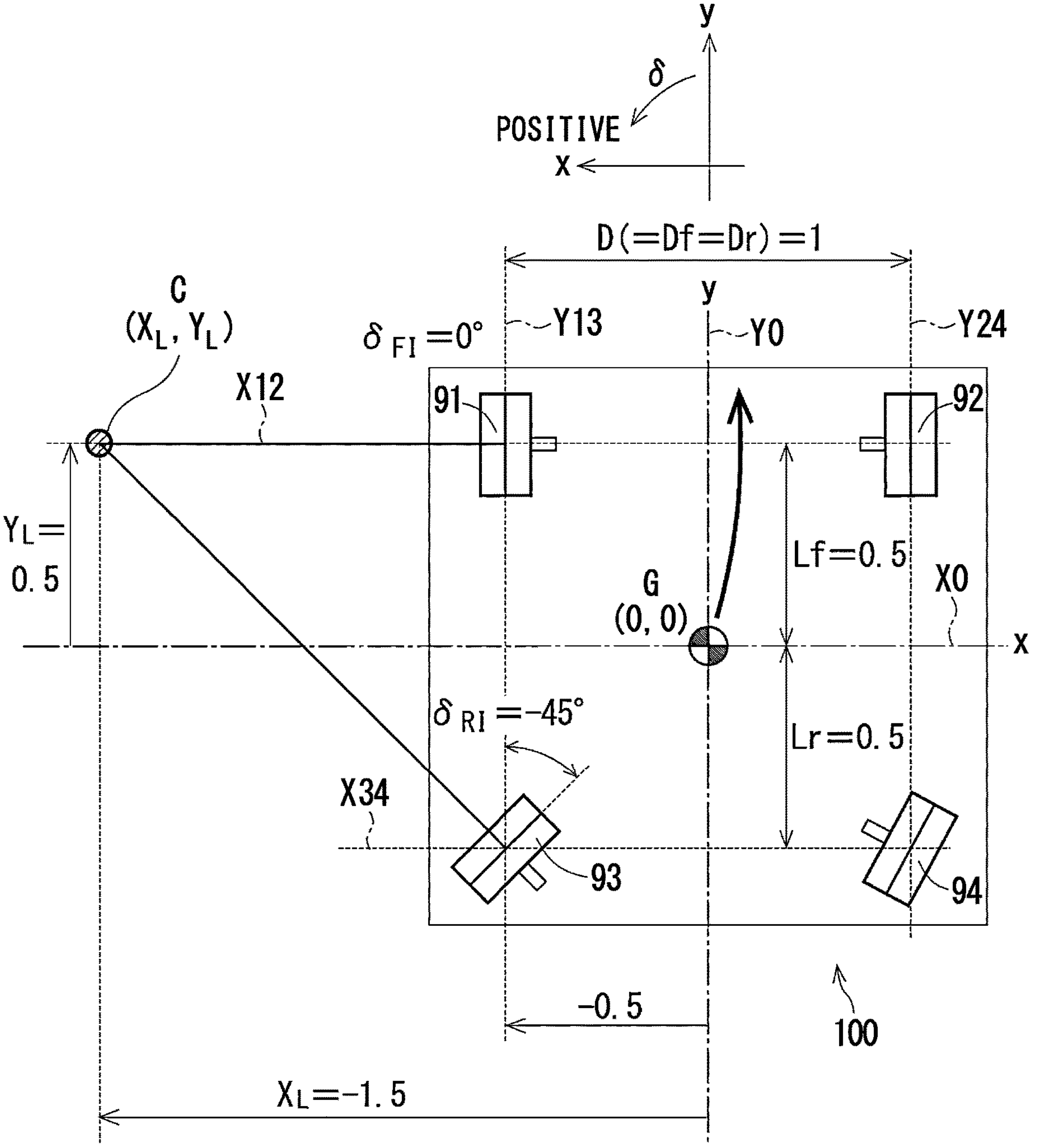
FIG. 27 is a diagram of a third example for determining the turning center coordinates in the forward turning mode.

Next, the forward turning mode will be described with reference to FIGS. 25 to 28. First to third examples shown in FIGS. 25 to 27 are based on an assumption that a small steering module is used. In the first example shown in FIG. 25, the turning angle δFI of the inner front wheel 91 is set to 45 degrees, and the turning angle δRI of the inner rear wheel 93 is set to −45 degrees, and the coordinates of the turning center C are calculated as XL=−1.0, and YL=0. When the front and rear wheels are in opposite phase, that is, when the turning angle δFI of the inner front wheel 91 and the turning angle δRI of the inner rear wheel 93 have opposite signs but equal absolute values (−δFI=δRI), the coordinates of the turning center C are set on the gravity axis X0.

In the second example shown in FIG. 26, the turning angle δFI of the inner front wheel 91 is set to 45 degrees, and the turning angle δRI of the inner rear wheel 93 is set to 0 degrees, and the coordinates of the turning center C are calculated as XL=−1.5, and YL=−0.5. In other words, when only the front wheels 91 are steered while the rear wheels 93 are kept pointed straight, the coordinates of the turning center C are set on the rear wheel axis X34. This example is not limited to a four-wheel independently steering vehicle, but can also be applied to a vehicle in which only the left and front right wheels 91, 92 are independently steerable.

In the third example shown in FIG. 27, the turning angle δFI of the inner front wheel 91 is set to 0 degrees, and the turning angle δRI of the inner rear wheel 93 is set to −45 degrees, and the coordinates of the turning center C are calculated as XL=−1.5, and YL=0.5. In other words, when only the rear wheels 93 are steered while the front wheels 91 are kept pointed straight, the coordinates of the turning center C are set on the front wheel axis X12. This example is not limited to a four-wheel independently steering vehicle, but can also be applied to a vehicle in which only the left and rear right wheels 93, 94 are independently steerable.

Figure 28:
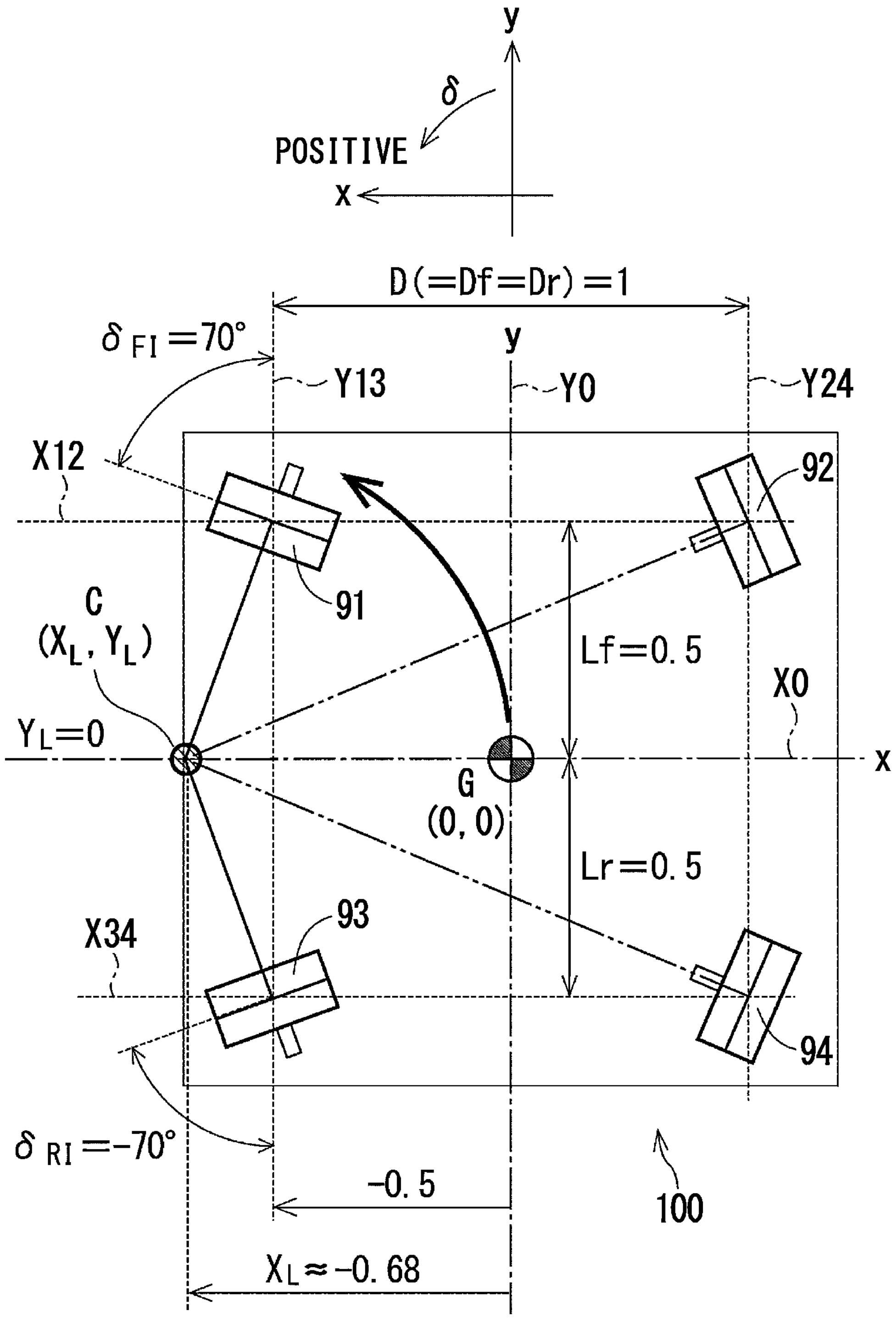
FIG. 28 is a diagram of a fourth example for determining the turning center coordinates in the forward turning mode.

FIG. 28 shows a fourth example in which the front and rear wheels are in opposite phase and which assumes a medium steering module. When the turning angle δFI of the inner front wheel 91 is set to 70 degrees and the turning angle δRI of the inner rear wheel 93 is set to −70 degrees, the coordinates of the turning center C are calculated as XL≈−0.68, and YL=0. Fractions of calculated values are expressed to two significant digits. Furthermore, in a case of the front and rear wheels being in opposite phase in the large steering module, as the turning angle δFI of the inner front wheel 91 approaches 90 degrees and the turning angle δRI of the inner rear wheel 93 approaches −90 degrees, the coordinates of the turning center C asymptotically approach "XL=−0.5" on the gravity axis X0, that is, a point on the left-front-rear wheel axis Y13.

[2] Non-Forward Turning Mode

Next, the non-forward turning mode will be described with reference to FIGS. 29 to 32. As described above, in the non-forward turning mode, of the front wheels 91, 92 and the rear wheels 93, 94, the wheels closer to the turning center C are defined as the inner front wheel and the inner rear wheel. When "XL<0" and the coordinate of the turning center C is to the left of the vehicle longitudinal axis Y0, a pivot turn to the left is possible. In other words, when the calculated XL is 0 or a positive value, it is determined that the non-forward turning mode cannot be realized with the turning angles δFI, δRI of the front and rear wheels on the inside of the turn for that vehicle specification.

Figure 29:
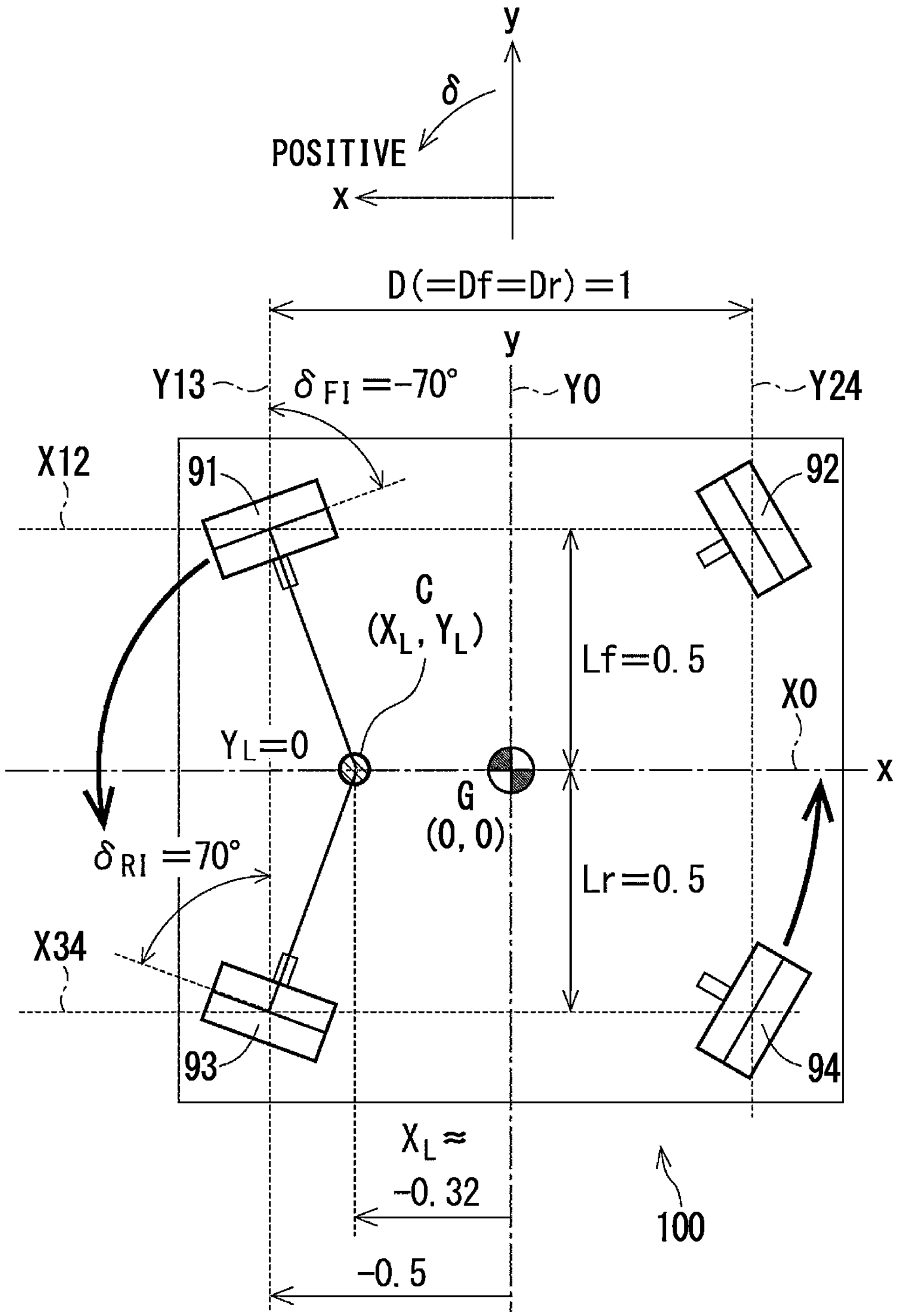
FIG. 29 is a diagram of the first example of determining the turning center coordinates in the non-forward turning mode.

The first example shown in FIG. 29 is intended to be the medium steering module. The turning angle δFI of the inner front wheel 91 is set to −70 degrees, and the turning angle δRI of the inner rear wheel 93 is set to 70 degrees, and the coordinates of the turning center C are calculated as XL≈−0.32, and YL=0. When the front and rear wheels are in opposite phase (δFI=−δRI), the coordinates of the turning center C are set on the gravity axis X0 between the left-front-rear wheel axis Y13 and the vehicle longitudinal axis Y0 (−0.5<XL<0).

Figure 30:
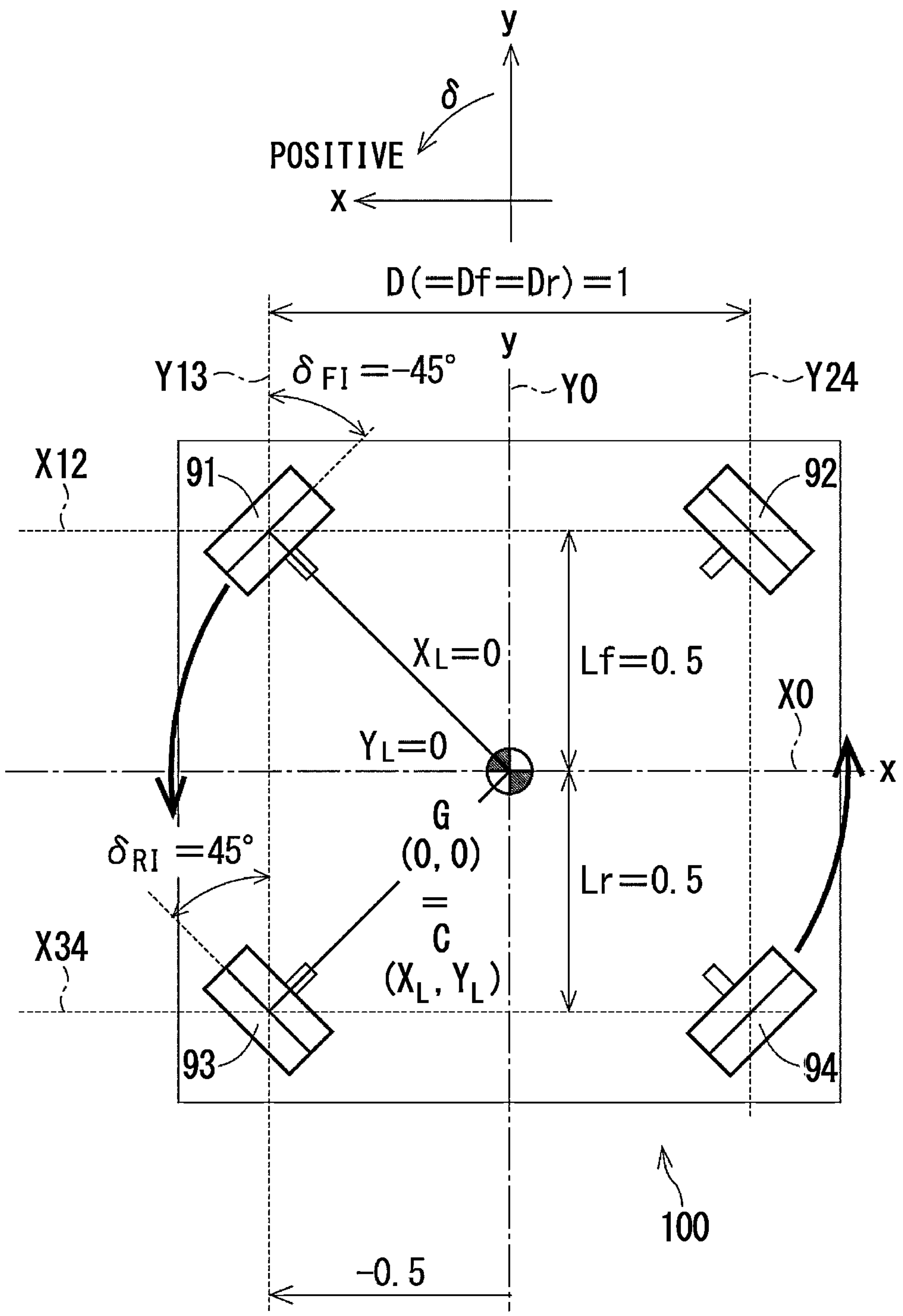
FIG. 30 is a reference diagram illustrating the turning center coordinates in the non-forward turning mode (spin turn)

FIG. 30 is a reference diagram illustrating the spin turn in which the turning center C coincides with the center of gravity G in the small steering module in which the turning angle δFI of the inner front wheel 91 is −45 degrees and the turning angle δRI of the inner rear wheel 93 is 45 degrees. A distance from the turning center C to the left front and rear wheels 91, 93 and a distance from the turning center C to the right front and rear wheels 92, 94 become equal, creating a special situation in which both left and right turns are possible when the turning center C coincides with the center of gravity G. In this case, since the "front and rear wheels on the inside of the turn" are not defined, the coordinate determination unit 66 does not apply equations (1) to (4) but determines the coordinates of the turning center C as a special case.

Figure 31:
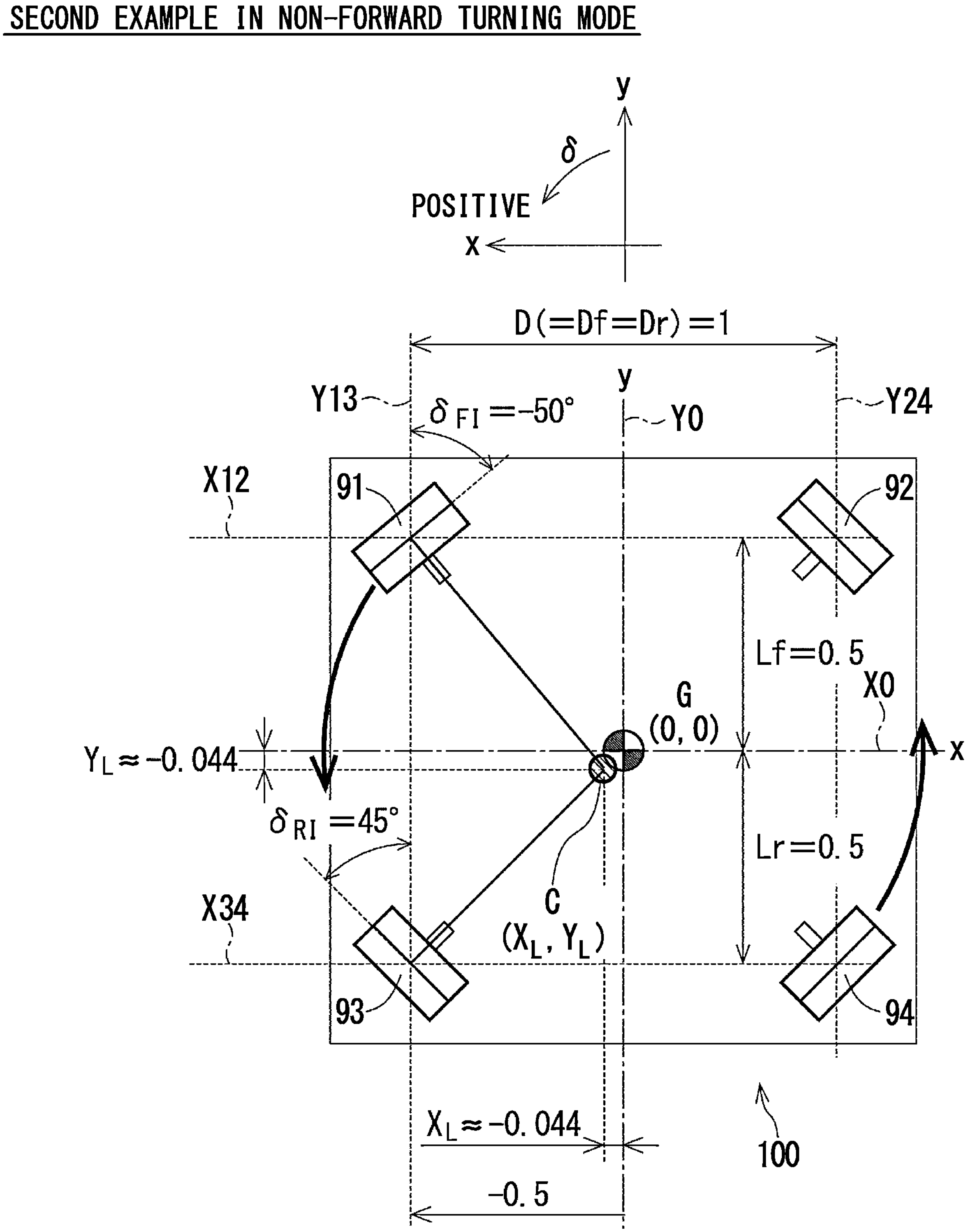
FIG. 31 is a diagram of the second example for determining the turning center coordinates in the non-forward turning mode.

In contrast, a second example shown in FIG. 31 assumes the use of a modified steering module in which the maximum turning angle of the inner front wheel 91 is extended to 50 degrees with respect to the small steering module. When the turning angle δFI of the inner front wheel 91 is −50 degrees and the turning angle δRI of the inner rear wheel 93 is 45 degrees, the coordinates of the turning center C are slightly shifted from the center of gravity G toward the rear left wheel 93 side. Therefore, the left front and rear wheels 91, 93 are defined as the "front and rear wheels on the inside of the turn", and using equations (1), (2), the coordinates of the turning center C are calculated as XL≈−0.044, and YL≈−0.044. At this time, the pivot turn that is close to the spin turn (super pivot turn) is realized.

Moreover, in a third example shown in FIG. 32, the tread width D (=Df=Dr) is set to 1.5 in this example only. In this way, in a long tread vehicle in which the tread width D is longer than the wheelbase L, when the turning angle δFI of inner front wheel 91 is −45 degrees and the turning angle δRI of inner rear wheel 93 is 45 degrees, the coordinate of turning center C shifts to the left of the center of gravity G. Therefore, the left front and rear wheels 91, 93 are defined as the "front and rear wheels on the inside of the turn", and using equations (1), (2), the coordinates of the turning center C are calculated as XL=−0.25, and YL=0. In this case, the pivot turn that is close to the spin turn can be achieved.

[3] Lateral Movement Mode

Next, the lateral movement mode will be described with reference to FIGS. 33 to 35. The lateral movement mode excludes true lateral movement (FIG. 15), where the turning angle of each wheel 91-94 is 90 degrees, and includes a diagonal movement from forward movement (FIGS. 14, 17). It is assumed that there is a difference of 1 degrees between the turning angle δFI of the inner front wheel 91 and the turning angle δRI of the inner rear wheel 93 during the diagonal movement. In the case of the diagonal movement to the left from the forward movement, the conditions are "δFI>1, δRI=δFI−1>0". In addition, in the case of the diagonal movement from backward movement to the left, a condition is "δFI=δRI+1<0, and δRI<−1".

In the lateral movement mode, there are two turning centers C1, C2 that are separated in the left-right direction, but in a case of turning left, the coordinates of the first turning center C1 relative to the left front and rear wheels 91, 93 on the inside of the turn are calculated using equations (1), (2). Fractions of calculated values are expressed to two significant digits. The second turning center C2 for the right front and rear wheels 92, 94 on the outside of the turn is calculated by offsetting the first turning center C1 to the right by the tread width D. In addition, in a case of a right turn, the coordinates of the first turning center C1 for the right front and rear wheels 92, 94 on the inside of the turn are calculated using equations (3), (4), and the second turning center C2 for the left front and rear wheels 91, 93 on the outside of the turn is calculated by offsetting the first turning center C1 to the left by the tread width D.

Figure 33:
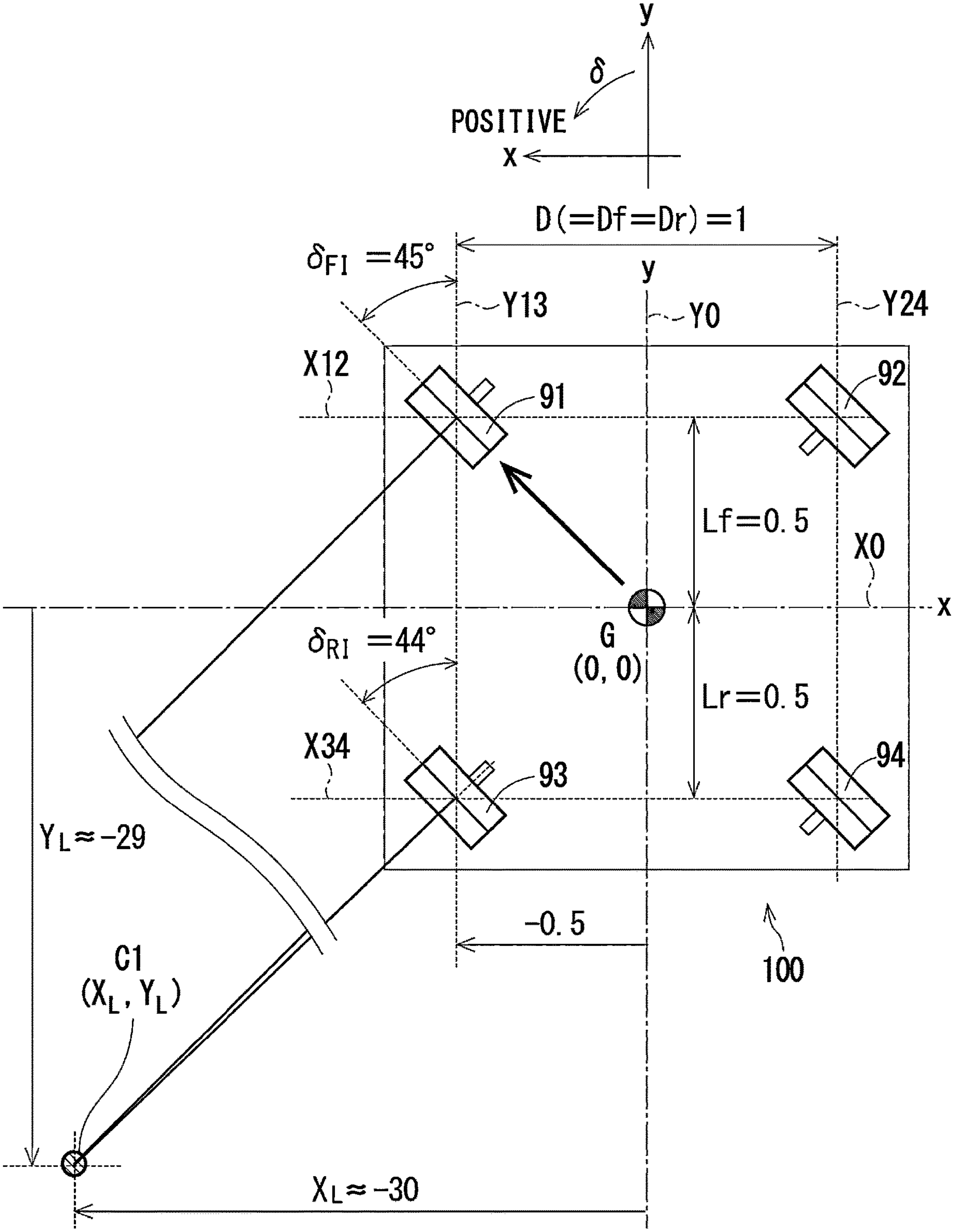
FIG. 33 is a diagram of the first example for determining the turning center coordinates in the lateral movement mode.

A first example shown in FIG. 33 is intended to be the small steering module. The turning angle δFI of the inner front wheel 91 is set to 45 degrees, and the turning angle δRI of the inner rear wheel 93 is set to 44 degrees, and the coordinates of the turning center C are calculated to be XL≈−30, and YL≈−29. In other words, the turning center C is set far away from the vehicle 100. The greater a difference between the turning angle δFI of the inner front wheel 91 and the turning angle δRI of the inner rear wheel 93, the closer the turning center C is to the vehicle 100.

Figure 34:
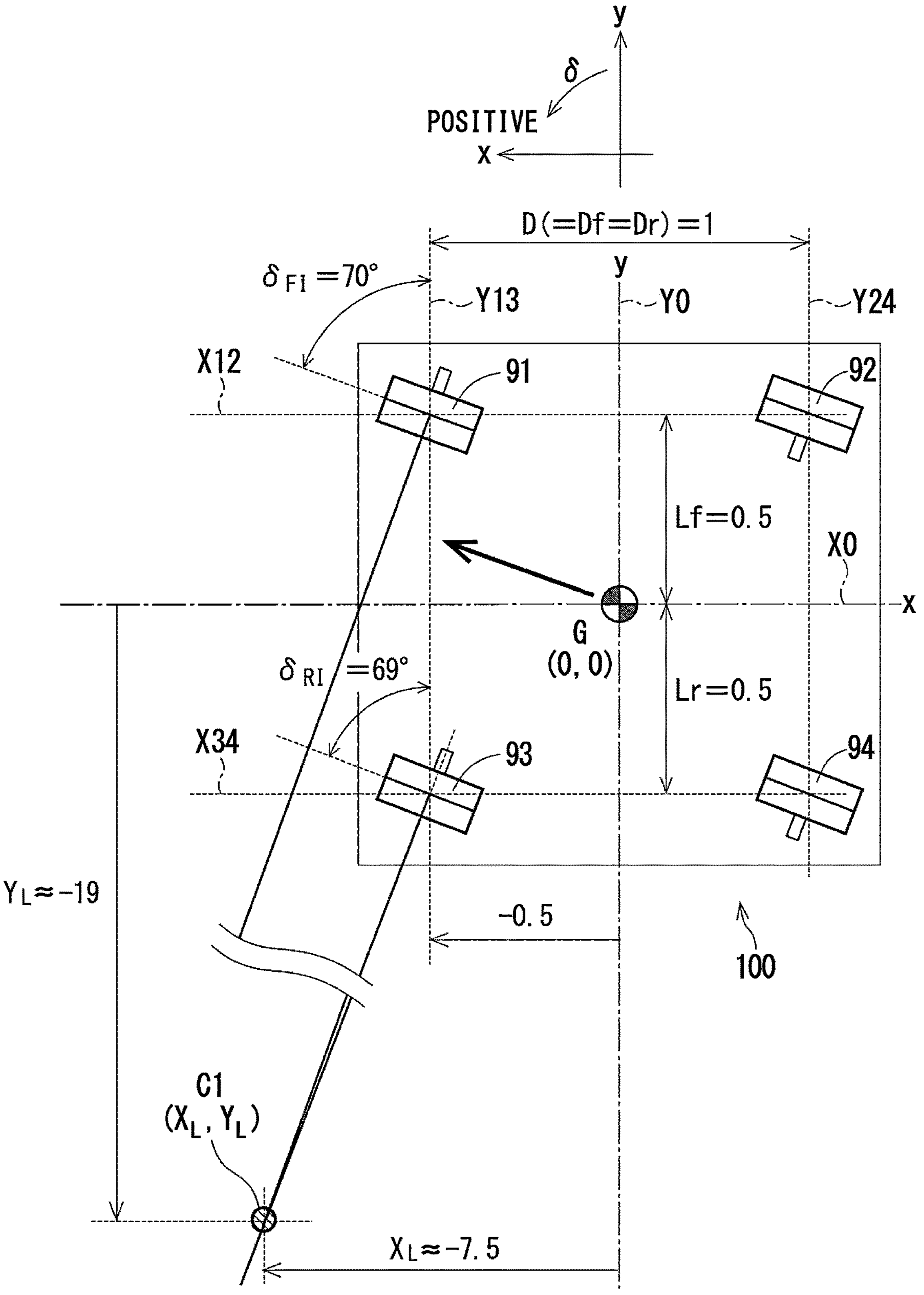
FIG. 34 is a diagram of the second example for determining the turning center coordinates in the lateral movement mode.

A second example shown in FIG. 34 is intended to be the medium steering module. The turning angle δFI of the inner front wheel 91 is set to 70 degrees, and the turning angle δRI of the inner rear wheel 93 is set to 69 degrees, and the coordinates of the turning center C are calculated to be XL≈−7.5, and YL≈−19.

Figure 35:
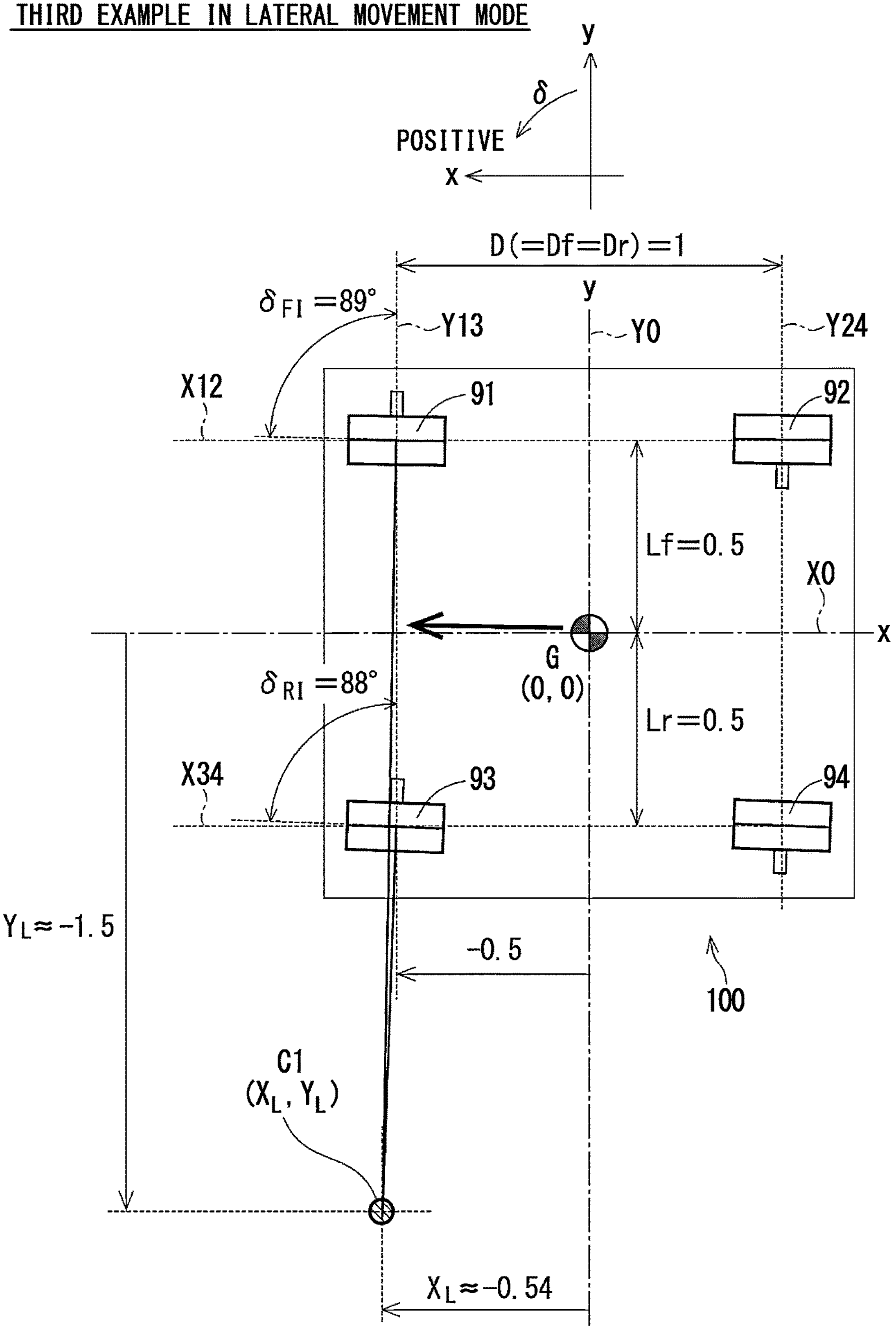
FIG. 35 is a diagram of the third example for determining the turning center coordinates in the lateral movement mode.

A third example shown in FIG. 35 is based on assumption of the large steering module. The turning angle δFI of the inner front wheel 91 is set to 89 degrees, and the turning angle δRI of the inner rear wheel 93 is set to 88 degrees, and the coordinates of the turning center C are calculated to be XL≈−0.54, and YL≈−1.5. When the turning angle δFI of the inner front wheel 91 approaches 90 degrees, XL approaches −0.5.

As described above, it has been verified that the coordinates of the turning center C in the forward turning mode, the coordinates of the turning center C in the non-forward turning mode, and the coordinates of the first turning center C1 in the lateral movement mode are all calculated using equations (1), (2) when turning left. Similarly, in a case of a right turn, the coordinates of the turning center C or the first turning center C1 are calculated by the formulas (3), (4). This makes it possible to calculate the coordinates of the turning center C or the first turning center C1 according to the maximum turning angle of the front and rear wheels on the inside of the turn, and also makes it possible to determine in advance whether a requested vehicle operation mode can be executed.

Second Embodiment

Figure 36:
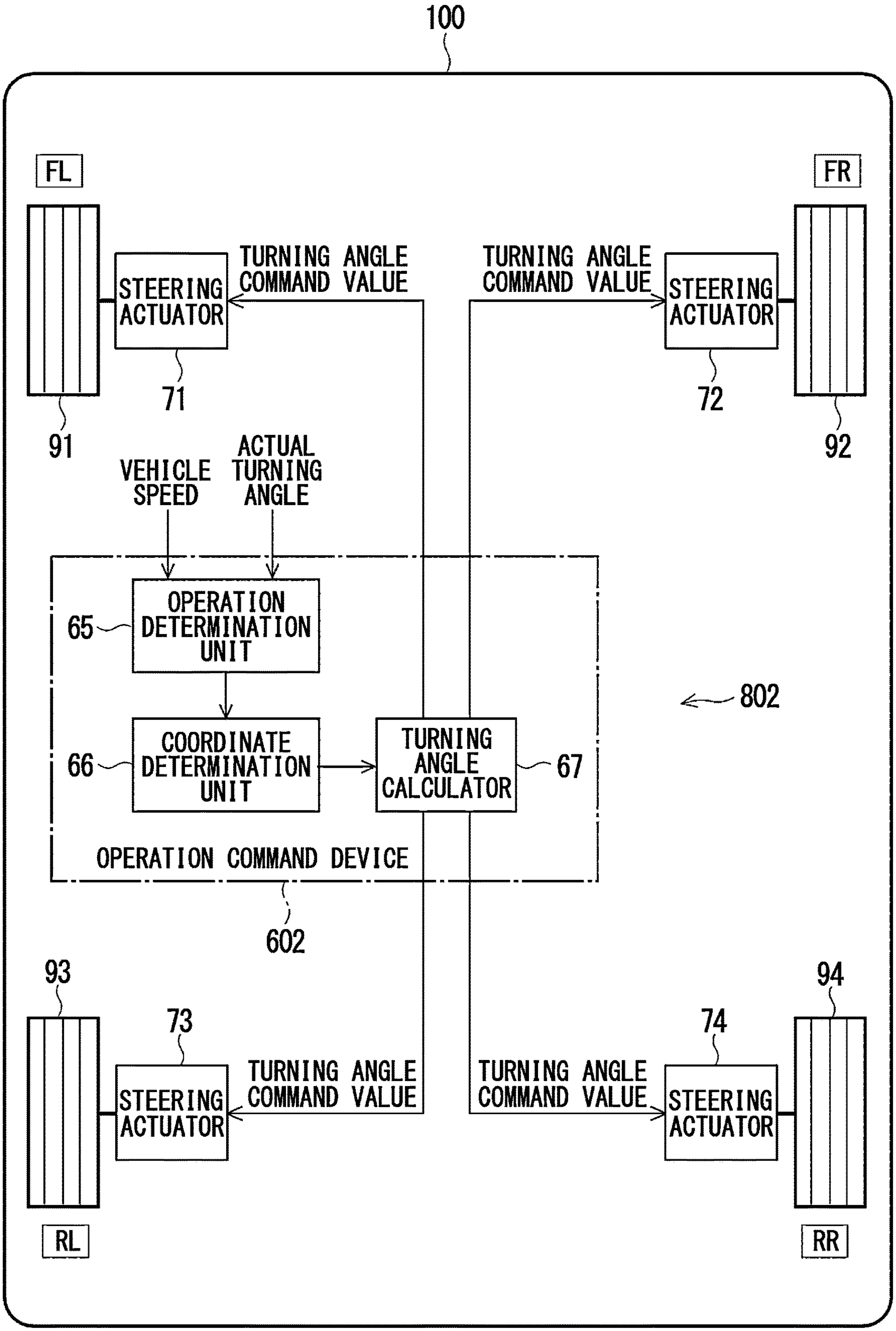
FIG. 36 is a block diagram of a steering device according to a second embodiment.

A configuration of a steering device 802 of a second embodiment will be described with reference to FIG. 36. In the second embodiment, a "mechanical and electrical separate" configuration is adopted in which one turning angle calculator 67 is arranged inside an operation command device 602. A turning angle calculator 67 collectively calculates turning angle command values for all wheels 91-94 based on the coordinates of the turning center determined by the coordinate determination unit 66, and communicates the calculated turning angle command values to the respective steering actuators 71-74. The steering actuators 71-74 of the respective wheels are operated in accordance with the turning angle command value calculated by the turning angle calculator 67.

Also in the second embodiment, the same effects and actions as those of the first embodiment can be obtained. Furthermore, the single turning angle calculator 67 can efficiently calculate the turning angles of the wheels.

Other Embodiments

A steering device of the present disclosure is not limited to four-wheel vehicles, but can also be applied to three-wheel vehicles having one front wheel and two rear wheels, or two front wheels and one rear wheel. A front wheel axis and a rear wheel axis that determine the turning center setting range in the forward turning mode are similarly defined using a rotation axis of one wheel. However, in the lateral movement mode for a three-wheeled vehicle, unlike a four-wheeled vehicle, three turning centers corresponding to the respective wheels are set.

In addition, a steering device of the present disclosure can be similarly applied to six-wheel or eight-wheel independently steering vehicles having three or more rows of left and right wheel pairs in the front-rear direction of the vehicle. In summary, the steering device of the present disclosure is applied to "a vehicle in which three or more wheels that are not mechanically restrained from one another can be steered independently."

The mechanically and electrically integrated configuration according to the first embodiment and the mechanically and electrically separate configuration according to the second embodiment may coexist. For example, left and front right wheels 91, 92 may be configured as an integrated electromechanical structure, and left and rear right wheels 93, 94 may be configured as separate electromechanical structures. Alternatively, an integrated turning angle calculator and a separate turning angle calculator may be provided redundantly for one steering actuator.

The operation determination unit 65 may acquire information on other vehicles and obstacles in a vicinity, information on a slope and friction coefficient of a road surface, wind direction and speed as the vehicle state in addition to the vehicle speed and the actual turning angle of each wheel, and determine the vehicle operation based on this information. For example, when steering on an inclined road surface or a road surface with a small coefficient of friction, Ackermann steering geometry may not be adopted and vehicle motion that causes the wheels to skid may be determined taking into account braking effects.

The present disclosure should not be limited to the embodiment described above. Various other embodiments may be implemented without departing from the scope of the present disclosure.

The disclosure of "the steering device in which the vehicle state input to the operation determination unit includes a vehicle speed and an actual turning angle of each wheel" may be combined with the disclosure of any other steering device described herein.

The disclosure of "the steering device in which the coordinate determination unit determines the coordinates of the turning center with the center of gravity (G) of the vehicle as the origin." may be combined with the disclosure of any other steering device described herein.

The disclosure of "a steering device in which the turning angle calculator (671 to 674) corresponding to each wheel and the steering actuator are integrally provided, and the steering actuator operates in accordance with the turning angle command value calculated by the turning angle calculator for each wheel." and "a steering device including one turning angle calculator (67) that calculates turning angle command values for all wheels, and in which the steering actuators for each wheel operate in accordance with the turning angle command values calculated by the turning angle calculator." may be combined with the disclosure of any other steering device described herein.

The controllers, for example, the operation determination unit, the coordinate determination unit, and the turning angle calculator, and the method thereof of the present disclosure may be implemented by a dedicated computer provided by configuring a processor and a memory programmed to execute one or more functions embodied by a computer program. Alternatively, the controller and the method thereof described in the present disclosure may be implemented by a dedicated computer provided by configuring a processor with one or more dedicated hardware logic circuits. Alternatively, the controller and the method thereof described in the present disclosure may be implemented by one or more dedicated computers configured by a combination of a processor and a memory programmed to execute one or more functions and a processor configured by one or more hardware logic circuits. The computer program may be stored in a computer-readable non-transitory tangible storage medium as an instruction executed by a computer.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A steering device configured to control a turning angle of each wheel in a vehicle having three or more wheels not being mechanically constrained to each other and including one or more front wheels and one or more rear wheels, the wheels being configured to be steered independently, the steering device comprising:
- an operation determination unit configured to determine a vehicle operation mode based on a vehicle state, the vehicle operation mode including a forward turning mode in which the vehicle turns while moving forward, a non-forward turning mode in which the vehicle turns without moving forward, and a lateral movement mode in which the vehicle moves in a lateral direction intersecting with a longitudinal axis of the vehicle;
- a coordinate determination unit configured to determine coordinates of a turning center of the vehicle based on the vehicle operation mode determined by the operation determination unit;
- a turning angle calculator configured to calculate a turning angle command value for each wheel based on the coordinates of the turning center determined by the coordinate determination unit; and
- steering actuators provided correspondingly to the respective wheels, the steering actuators steering the respective wheels in accordance with the turning angle command values calculated by the turning angle calculator, wherein
- the coordinate determination unit is configured to determine coordinates of two turning centers, which are spaced apart in a left-right direction of the vehicle, in the lateral movement mode.

2. The steering device according to claim 1, wherein
- the turning angle calculator calculates the turning angle of each wheel so that a turning direction of each wheel is perpendicular to a straight line connecting the turning center and the center of each wheel.

3. The steering device according to claim 1, wherein
- an axis passing through a center of the front wheel and perpendicular to the longitudinal axis is a front wheel axis,
- an axis passing through a center of the rear wheel and perpendicular to the longitudinal axis is a rear wheel axis, and
- the coordinate determination unit is configured to determine coordinates of a turning center on an inside of a turn of the vehicle and on an outside of the vehicle between the front wheel axis and the rear wheel axis when the operation determination unit determines the forward turning mode.

4. The steering device according to claim 1, wherein
- the coordinate determination unit is configured to determine coordinates of a turning center within the vehicle when the operation determination unit determines the non-forward turning mode.

5. The steering device according to claim 1, wherein
- an axis passing through a center of the rear wheel and perpendicular to the longitudinal axis is a rear wheel axis, and
- the coordinate determination unit is configured to determine coordinates of two turning centers, which are spaced apart in a left-right direction of the vehicle, rearward of the rear wheel axis when the operation determination unit determines the lateral movement mode from forward movement.

6. The steering device according to claim 1, wherein an axis passing through a center of the front wheel and perpendicular to the longitudinal axis is a front wheel axis, and the coordinate determination unit is configured to determine coordinates of two turning centers, which are spaced apart in a left-right direction of the vehicle, frontward of the front wheel axis when the operation determination unit determines the lateral movement mode from backward movement.

7. The steering device according to claim 5, wherein the steering device is applied to a four-wheel vehicle including two front wheels and two rear wheels, and the coordinate determination unit is configured to determine, as the coordinates of the two turning centers, coordinates of a first turning center for the front and rear wheels positioned inside of a turn and coordinates of a second turning center for the front and rear wheels positioned outside of the turn.

8. The steering device according to claim 7, wherein an axis passing through a center of the front wheel and a center of the rear wheel on the same side in the left-right direction of the vehicle is a front-rear wheel axis, and the coordinate determination unit is configured to determine the coordinates of the first turning center on the front-rear wheel axis on an inner side of the turn and the coordinates of the second turning center on the front-rear wheel axis on an outer side of the turn in a case of moving directly sideways in the lateral movement mode.

9. The steering device according to claim 1, wherein the vehicle state input to the operation determination unit includes a vehicle speed and an actual turning angle of each wheel.

10. The steering device according to claim 1, wherein the coordinate determination unit is configured to determine coordinates of a turning center with a center of gravity of the vehicle as an origin.

11. The steering device according to claim 1, wherein the turning angle calculator is one of a plurality of turning angle calculators that each correspond to a respective wheel, for each wheel, the respective turning angle calculator corresponding to the wheel and a respective steering actuator of the steering actuators corresponding to the wheel are integrally provided, and each steering actuator operates in accordance with a turning angle command value calculated by the turning angle calculator corresponding to the wheel.

12. The steering device according to claim 1, wherein the turning angle calculator is a singular element and configured to calculate turning angle command values for all wheels, and the steering actuator of each wheel operates in accordance with the turning angle command value calculated by the turning angle calculator.

13. The steering device according to claim 2, wherein the steering device is applied to a four-wheel vehicle including two front wheels and two rear wheels, a front wheel closer to the turning center among the front wheels is an inner front wheel, and a rear wheel closer to the turning center among the rear wheels is an inner rear wheel, including in the non-forward turning mode, an axis passing through a center of gravity of the vehicle and perpendicular to the longitudinal axis is a gravity axis, an axis passing through centers of the front wheels and perpendicular to the longitudinal axis is a front wheel axis, and an axis passing through centers of the rear wheels and perpendicular to the longitudinal axis is a rear wheel axis, a distance from the gravity axis to the front wheel axis is a front-wheel axis distance, a distance from the gravity axis to the rear wheel axis is a rear-wheel axis distance, and the coordinate determination unit is configured to determine coordinates of a turning center of the vehicle based on the turning angle of the inner front wheel, the turning angle of the inner rear wheel, the front-wheel axis distance, the rear-wheel axis distance, a front wheel tread width, and a rear wheel tread width when a turning angle of the inner front wheel and a turning angle of the inner rear wheel are determined before coordinates of the turning center are determined by the coordinate determination unit.

14. The steering device according to claim 13, wherein the coordinate determination unit is configured to use coordinates in which the center of gravity of the vehicle is an origin, the gravity axis is an x-axis, the longitudinal axis is a y-axis, and a right side of the center of gravity on the x-axis is positive and a left side is negative, and a front side of the center of gravity on the y-axis is positive and a rear side is negative, turning angles of the inner front wheel and the inner rear wheel are positive in a counterclockwise direction from a neutral position, and negative in a clockwise direction from the neutral position, the turning angle of the inner front wheel is δFI, the turning angle of the inner rear wheel is δRI, the front-wheel axis distance is Lf, the rear-wheel axis distance is Lr, the front wheel tread width is Df, and the rear wheel tread width is Dr, $\delta FI \neq \delta RI$, $-90° < \delta FI < 90°$, and $-90° < \delta RI < 90°$, and the coordinate determination unit is configured to calculate the coordinates of the turning center or a first turning center when turning left using equations (1) and (2), and the coordinates of the turning center or the first turning center when turning right using equations (3) and (4) for coordinates of the turning center in the forward turning mode and the non-forward turning mode, and coordinates of the first turning center relative to the inner front wheel and the inner rear wheel in the lateral movement mode.

[Math 1]

$$X_L = \frac{-\frac{1}{2}(Df\tan\delta_{FI} - Dr\tan\delta_{RI}) - (Lf + Lr)}{\tan\delta_{FI} - \tan\delta_{RI}} \tag{1}$$

$$Y_L = \left\{ \frac{-\frac{1}{2}(Df\tan\delta_{FI} - Dr\tan\delta_{RI} - (Lf + Lr)}{\tan\delta_{FI} - \tan\delta_{RI}} + \frac{Df}{2} \right\} \tan\delta_{FI} + Lf \tag{2}$$

[Math 2]

$$X_R = \frac{\frac{1}{2}(Df\tan\delta_{FI} - Dr\tan\delta_{RI}) - (Lf + Lr)}{\tan\delta_{FI} - \tan\delta_{RI}} \tag{3}$$

-continued $$Y_R = \left\{ \frac{\frac{1}{2}(Df\tan\delta_{FI} - Dr\tan\delta_{RI}) - (Lf + Lr)}{\tan\delta_{FI} - \tan\delta_{RI}} - \frac{Df}{2} \right\} \tan\delta_{FI} + Lf \tag{4}$$

15. A steering device configured to control a turning angle of each wheel in a vehicle having three or more wheels not being mechanically constrained to each other and including one or more front wheels and one or more rear wheels, the wheels being configured to be steered independently, the steering device comprising:

at least one processor; and at least one memory storing computer program code, wherein the at least one memory and the computer program code are configured, with the at least one processor, to cause the steering device to carry out:

determining a vehicle operation mode based on a vehicle state, the vehicle operation mode including a forward turning mode in which the vehicle turns while moving forward, a non-forward turning mode in which the vehicle turns without moving forward, and a lateral movement mode in which the vehicle moves in a lateral direction intersecting with a longitudinal axis of the vehicle;

determining coordinates of a turning center of the vehicle based on the vehicle operation mode;

calculating a turning angle command value for each wheel based on the coordinates of the turning center;

determining coordinates of two turning centers, which are spaced apart in a left-right direction of the vehicle, in the lateral movement mode;

outputting, to steering actuators provided correspondingly to the respective wheels, the turning angle command values; and steering, by the steering actuators, the respective wheels in accordance with the turning angle command values.

* * * * *